United States Patent [19]

Wanner et al.

[11] Patent Number: 5,774,680
[45] Date of Patent: Jun. 30, 1998

[54] INTERFACING DIRECT MEMORY ACCESS DEVICES TO A NON-ISA BUS

[75] Inventors: Christopher C. Wanner, Tomball; Jeffrey C. Stevens, Spring; Robert A. Lester; Dwight D. Riley, both of Houston; David J. Maguire, Spring, all of Tex.; James Edwards, Longmont, Colo.

[73] Assignee: Compaq Computer Corporation, Houston, Tex.

[21] Appl. No.: 570,394

[22] Filed: Dec. 11, 1995

[51] Int. Cl.⁶ .................................................. G06F 13/00
[52] U.S. Cl. .......................................... 395/290; 395/842
[58] Field of Search ................................... 395/290, 842, 395/308, 280, 846

[56] References Cited

U.S. PATENT DOCUMENTS 5,317,715  5/1994  Johnson et al. ........................ 395/425

FOREIGN PATENT DOCUMENTS

0653711A1  5/1995  European Pat. Off. .
58-019968  5/1983  Japan .
WO93/02420  2/1993  WIPO .

OTHER PUBLICATIONS intel® 8237A High Performance Programmable DMA Controller (8237A, 8237A-4, 8237A-5); Oct. 1987 (pp. 2-222-2-258).
PCI, Revision 2.1, A100910-940 (pp. 35-55); Jun. 1, 1995.
IBM Technical Disclosure Bulletin, vol. 31, No. 10, Mar. 1989, New york US, pp. 126-129, XP000081468 "emulation of ibm pc bus operations by an 80188 processor".

Primary Examiner—Ayaz R. Sheikh
Assistant Examiner—David A. Wiley
Attorney, Agent, or Firm—Pravel, Hewitt, Kimball & Krieger

[57] ABSTRACT

A computer system having separate, yet compatible DMA controllers on a bus. Each DMA controller for controlling at least one DMA channel, each DMA controller having an independent set of registers for performing DMA operations and a configuration register for indicating channel status and designation. A DMA master for compatibly communicating with a processor and for initializing and communicating with the multiple DMA controllers.

65 Claims, 11 Drawing Sheets

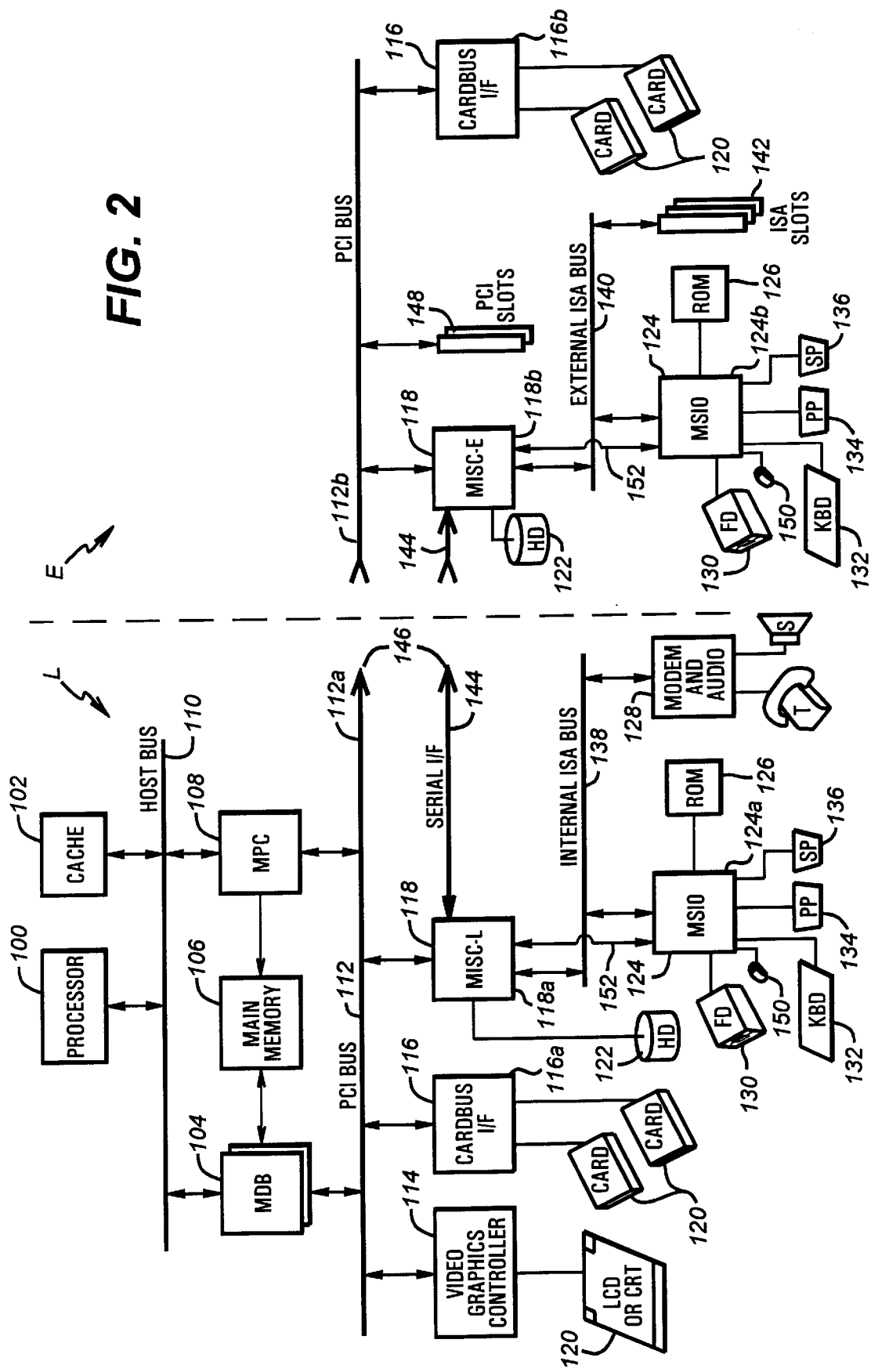

DMA DEVICE TO MAIN MEMORY TRANSFER

INTERFACING DIRECT MEMORY ACCESS DEVICES TO A NON-ISA BUS

BACKGROUND OF THE INVENTION

1. Field of the Invention

The invention relates to a method and apparatus of compatibly interfacing ISA DMA devices to a non-ISA bus and more particularly to a distributed DMA architecture on non-ISA buses, especially the PCI bus.

2. Description of the Related Art

Personal computers are constantly changing as new technologies evolve and are incorporated into the computer. Performance improvements in the microprocessor and memory have resulted in computers so powerful that they are now capable of performing tasks that before could only be performed by large mainframe computers. However, to fully replace a mainframe computer, the computer must have significant memory and storage capacity supported by a hearty I/O (input/output) subsystem.

Several standardized I/O buses are available to the system designer including: ISA (Industry Standard Architecture); EISA (Extended Industry Standard Architecture); PCI (Peripheral Component Interface); and VESA (Video Electronics Standards Association) local bus sometimes called VL-bus or VLB. Today's computers are typically designed with a PCI bus in conjunction with either an ISA bus or EISA bus. Familiarity with the PCI Local Bus Specification, Production Version, Revision 2.1, dated Jun. 1, 1995, which is published by the PCI Special Interest Group of Hillsboro, Oreg., is assumed for the purposes of this application, and it is hereby incorporated by reference.

When an ISA or EISA bus is present, standard I/O peripherals such as a floppy disk, are connected to the ISA or EISA bus. This is particularly relevant since the floppy disk is a peripheral which uses the direct memory access capability of the ISA architecture.

Direct memory access (DMA) is a method of directly accessing memory without involving the processor. DMA is normally used to transfer blocks of data to or from an I/O device, such as the floppy disk controller or enhanced parallel ports. DMA reduces the amount of processor interactions with memory, thereby freeing the processor for other processing tasks.

An IBM (International Business Machines) compatible computer system includes two Intel 8237 compatible DMA controllers. A complete description of the 8237 DMA controller is found in the 8237A High Performance Programmable DMA Controller datasheet published by Intel Corporation, and hereby incorporated by reference.

The 8237 DMA controller is a peripheral interface circuit for allowing peripheral devices to directly transfer data to or from main memory. It includes four independent channels and may be expanded to any number of channels by cascading additional controller chips. In the IBM architecture, two DMA controllers are used. One DMA controller is used for byte transfers, and the second DMA controller is user for word (16-bit) transfers. All four channels (designated 0, 1, 2 and 3) of the byte-wide DMA controller are dedicated to performing byte DMA operations. Of the four channels (designated 4, 5, 6 and 7) of the word-wide DMA controller, channels 5, 6 and 7 are dedicated for word DMA operations. Channel 4 is used for cascading the two controllers together and, therefore, is not available for normal DMA.

The ISA and EISA buses include signals for performing DMA operations. A peripheral connected to the ISA bus may request a DMA operation by providing a DMA request signal (DREQ#, where # is the channel number) over the ISA bus to the DMA controller. In response to a DREQ signal, the DMA controller will provide a DMA acknowledge (DACK#) signal to the peripheral when the DMA controller has been granted the ISA bus and is ready to perform the operation. The DMA controller then accesses the peripheral to move data over the ISA bus and between the peripheral and memory. However, since the PCI bus or the VL-but do not incorporate the ISA DMA signals, ISA DMA devices cannot presently be placed on these buses.

With the PCI bus becoming more popular because of its higher performance, it is desirable to connect many of the ISA peripherals directly to the PCI bus instead of the ISA bus. However, the incompatibility between the ISA DMA controller architecture and the PCI bus prevents the joining of these components.

In certain systems, such as portable computers, the limited space requirements allow only one expansion bus to be supported. If only the PCI bus is provided and the ISA bus is not, then ISA DMA capability is not directly supported. One method of supporting the ISA DMA operations is to include the DMA controllers in a single PCI device. However, all DMA devices must connect to this single device, so essentially the ISA bus must be present. Another alternative is to place the DMA controllers on the PCI bus. The special DMA signals can then be routed as sideband signals without interfering with PCI operations. However, with the advent of Plug and Play, any function that supports DMA must be programmable to more than one channel without the use of jumpers, and therefore, the relatively high number of sideband signals (fourteen DREQ# and DACK# signals) cause this solution to be unworkable, especially for portable applications. Familiarity with the Plug and Play Specification, available from Microsoft Corporation, is assumed for the purposes of this application, and it is hereby incorporated by reference.

Moreover, the DMA signals could be serialized to reduce pinouts, but then response time on the negative edge of the DREQ# signals might lead to late terminations. Therefore, this solution is not preferred.

The performance of the PCI bus is much greater than that of the ISA and EISA buses. Further, by not providing a PCI to ISA bridge chip costs can be reduced. As such, it is desirable to create a mechanism for incorporating ISA type DMA into devices that connect directly to the PCI bus or VL-bus so that a more flexible solution to ISA DMA can be provided for portable computers.

SUMMARY OF THE PRESENT INVENTION

A distributed direct memory access (DMA) architecture for a computer system is disclosed. The distributed DMA architecture includes a DMA master and at least one distributed DMA controller. The distributed DMA controller may include up to four DMA slave channels. Each DMA slave channel is functionally compatible with one channel of the Intel 8237 DMA controller. The DMA slave channels are independent with each having a set of 8237 compatible registers. A DMA master translates compatible accesses into bus transactions to the individual DMA slave channels and provides the result back to the processor in the compatible format.

Each DMA slave channel includes a set of 8237 compatible registers and a configuration register. The register sets for each DMA slave channel are located at unique addresses in the I/O space of the computer system according to the configuration register.

The DMA master provides backward compatibility with the legacy DMA controllers. As such, when distributed DMA is enabled, communications between the processor and the DMA subsystem are handled by the DMA master. The processor is not precluded from communicating directly with the DMA slave channels, but compatible accesses to the legacy DMA controllers are handled by the DMA master. After the DMA master receives a command, the DMA master interprets the processor command and routes the request to the appropriate DMA slave channels or distributed DMA controllers. By using bus retry operations the DMA master can receive the command; force the processor to retry the operation; complete the operation to the individual DMA slave channels at non-compatible addresses; and respond to the processor when it retries the operation as if the DMA master was the legacy DMA controllers of the prior art. This provides a compatible, yet channel separated DMA subsystem.

By using this novel method and structure of separate and independent DMA slave channels, individual DMA channels can be distributed among the input/output devices requiring DMA transfers, thereby supporting DMA on the PCI without requiring any change to existing software.

BRIEF DESCRIPTION OF THE DRAWINGS

A better understanding of the present invention can be obtained when the following detailed description of the preferred embodiment is considered in conjunction with the following drawings, in which:

FIG. 2 is a block diagram illustrating a computer system incorporating DMA devices on the PCI bus according the preferred embodiment;

DETAILED DESCRIPTION OF THE PREFERRED EMBODIMENT

Figure 1A:
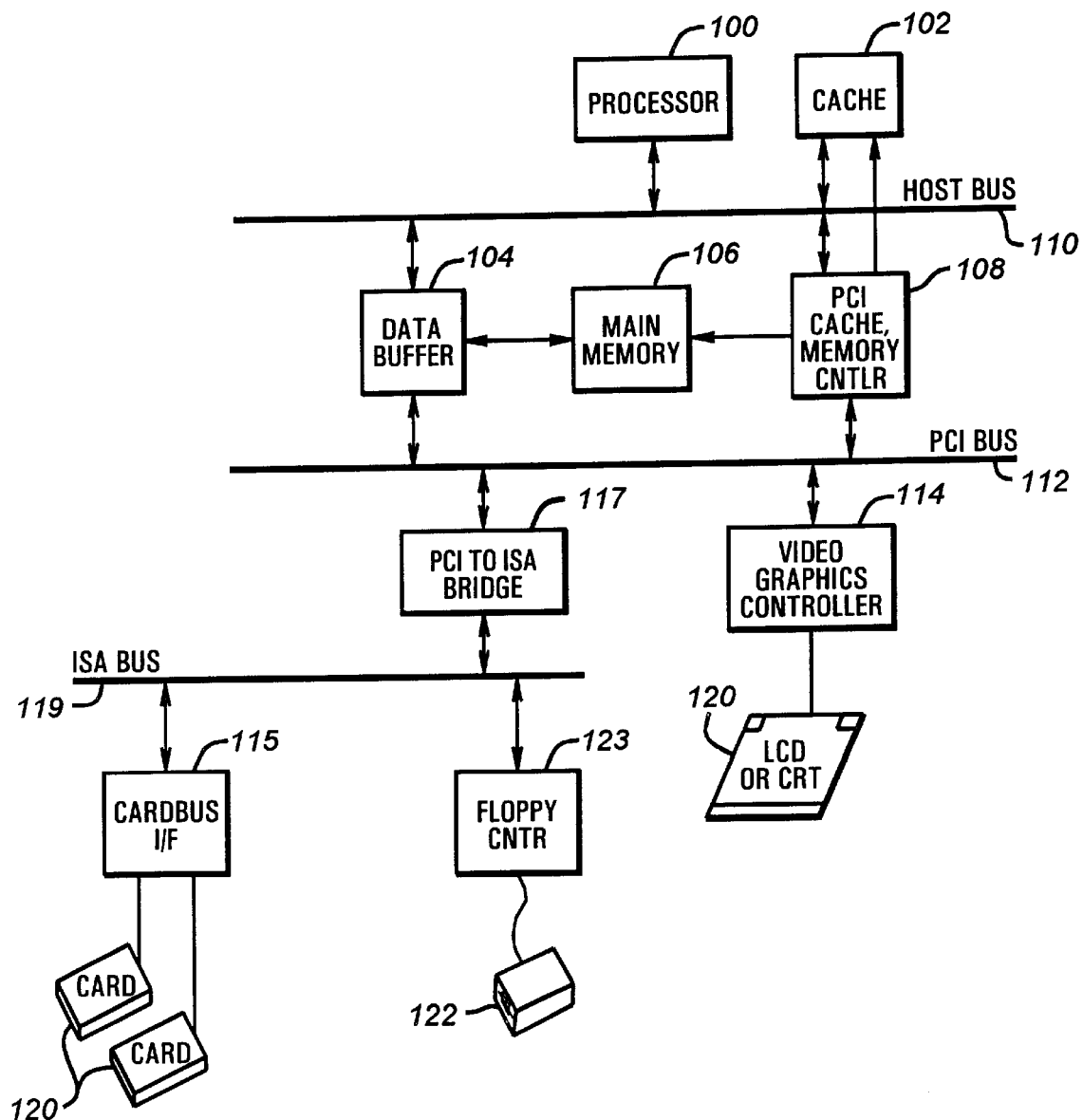
FIG. 1A is a block diagram illustrating a prior art computer system C incorporating DMA devices on the ISA bus.

To appreciate the novel features of the present invention, it is useful to first examine a computer system of the prior art. Referring to FIG. 1A, there is illustrated a computer system C of the prior art having conventional Direct Memory Access (DMA) support from an ISA bus 119. The computer system C includes a processor 100, such as a 486, Pentium® or 586 class processor coupled to a host bus 110. Also coupled to the host bus 110 are a high speed memory cache 102, a PCI/cache/memory controller 108, and a data buffer 104.

The PCI/cache/memory controller 108 is further coupled to a main memory 106 and a Peripheral Component Interface (PCI) bus 112 for controlling transfers between the processor 100/cache 102 and main memory 106; the processor 100 and the PCI bus 112; and between the PCI bus 112 and the main memory 106. The data buffer 104 provides a data path between the processor 100/cache 102 and main memory 106; a data path between the processor 100 and the PCI bus 112; and a data path between the PCI bus 112 and the main memory 106.

A number of PCI devices, such as a PCI video graphics controller 114 may be coupled directly to the PCI bus 112. The PCI video graphics controller 114 shown provides control and an interface to either a liquid crystal display (LCD) or cathode ray tube (CRT) monitor 120. A PCI/ISA bridge 117 is coupled to the PCI bus 112 for providing an interface to the ISA bus 119. The PCI/ISA bridge 117 includes conventional logic for allowing the PCI/ISA bridge 117 to perform as a PCI master or slave; a conventional ISA interface including master and slave logic and data buffers to isolate the PCI bus 112 from the ISA bus 119; and ISA support logic such as PCI and ISA arbitration logic, two 8259 compatible interrupt controllers, a 16-bit basic I/O services (BIOS) timer, three programmable timers/counters and non-maskable (NMI) control logic; and two cascaded 8237 compatible DMA controllers 202 and 204 (FIG. 1B), hereinafter referred to as a legacy DMA controller 200. The functions provided by the PCI/ISA bridge 114 are desirable in order to remain compatible with the early personal computer. The ISA bus 119 also supports a number of standard PC peripherals, such as serial ports, parallel ports and hard disks, which are not shown here for simplicity. The legacy DMA controller 200 provides certain ISA bus peripherals the ability to directly transfer data to or from main memory 106. One such peripheral is a floppy drive system, as illustrated by the floppy controller 120 coupled to a floppy drive 122. In an IBM compatible PC, the floppy controller 120 is coupled to a channel 2 of the DMA controllers 216 for performing the DMA transfers. In this prior art design, since the legacy DMA controllers 200 reside on the ISA bus 119 for compatibility reasons, and since the PCI bus does not support the ISA DMA, DMA utilizing devices such as the floppy controller 120, may not be coupled to the PCI bus 112 without incorporating a number of sideband signals for DMA request and acknowledge signals. The same is true of cards 120, if they require DMA. The sideband signals are especially undesirable since they require extra connector pins, if connecting through a connector.

Figure 1B:
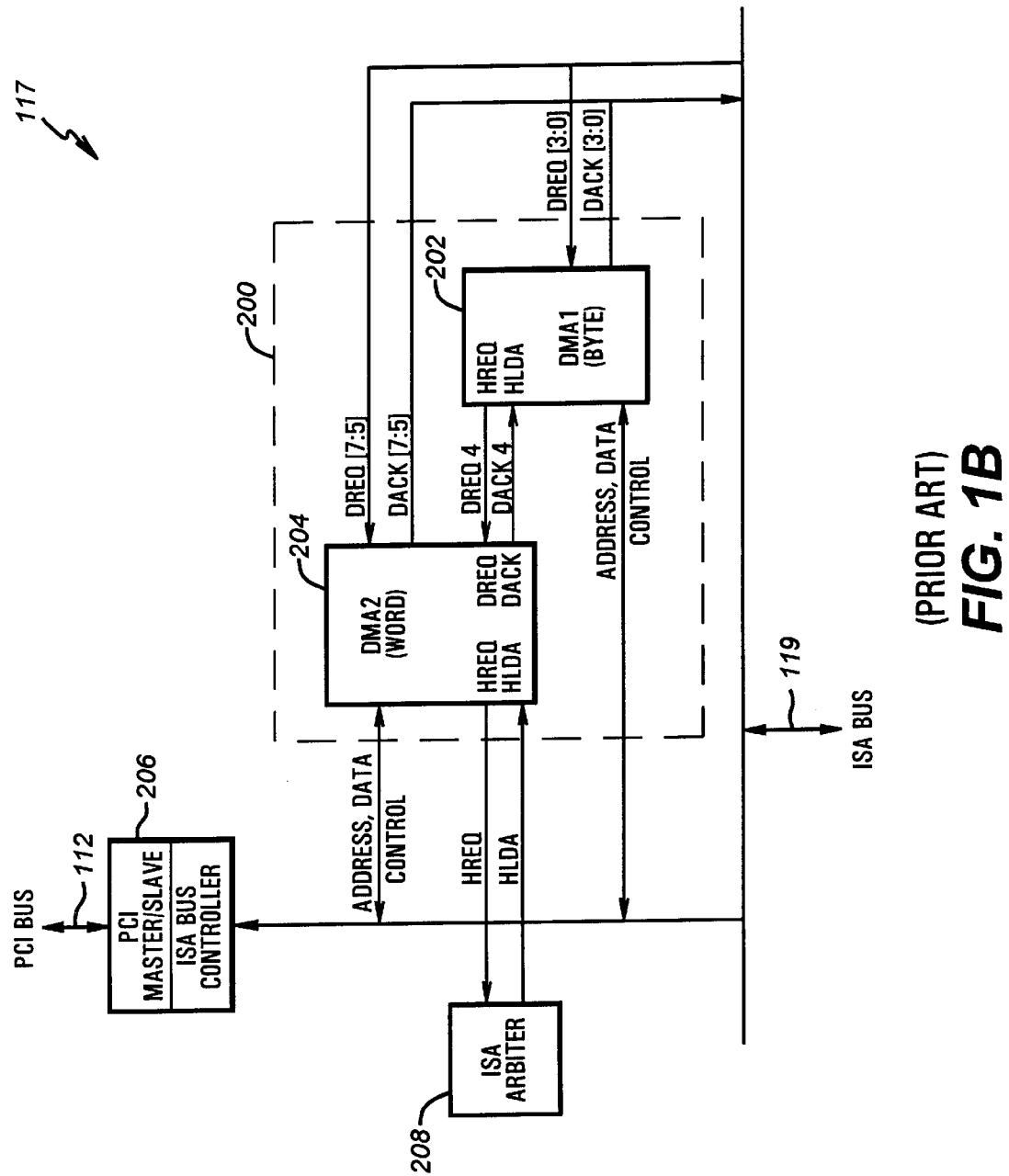
FIG. 1B is a block diagram illustrating the prior art DMA controller of FIG. 1A.

Now turning now to FIG. 1B, there is illustrated a more detailed block diagram of the PCI/ISA bridge 117. The PCI/ISA bridge 117 contains a conventional DMA controller 200, hereinafter referred to as a legacy DMA controller, which is comprised of two cascaded 8237 compatible DMA controllers 202 and 204. Each DMA controller 202 and 204 have four channels for performing DMA transfers. A first DMA controller (DMA1) 202 handles byte-wide transfers on channels conventionally called channels 3-0. The first DMA controller 202 is connected to a second DMA controller (DMA2) 204 in a cascaded fashion through one channel of DMA2, thereby rendering that channel unusable for DMA transfers. The second DMA controller 204 handles wordwide transfer on channels conventionally called channels 5-7. The legacy DMA controller 200 is coupled to an ISA bus controller 206 which also couples to the PCI bus 112 as a bridge. An ISA arbiter 208 receives ISA bus master request signals, such as HREQ, for awarding control of the ISA bus 119. Thus, the legacy DMA controller 200 resides on the ISA bus 119 and the ISA cycles must be transferred through the ISA bus controller and PCI master slave 206 to get to the PCI bus 112.

Referring now to FIG. 2, there is illustrated a block diagram of a computer system utilizing the present invention. According to the present invention, input/output devices requiring DMA support are coupled to the PCI bus 112 in a novel distributed DMA architecture, as disclosed herein.

The computer system is shown divided into a laptop portion L (hereinafter laptop computer L) and an expansion base unit portion E (hereinafter expansion base E). The laptop computer L is an operationally autonomous apparatus which is detachable from the expansion base E for remote computing operations. While the laptop computer L is docked into the expansion base E, the laptop computer L operates on AC power and while the computer L is detached from the expansion base E the laptop computer L operates from battery power. Mechanisms are also provided to operate the laptop computer from AC power while removed from the expansion base E. The expansion base E typically provides expandability for functions not included in the laptop portion L.

As can be seen, the devices connecting to the host bus 110 are similar to the devices illustrated in FIG. 1A. A processor 100 is provided in the laptop computer L which is a conventional microprocessor such as an Intel Pentium or its equivalent. The processor 100 couples to a host bus 110 for communicating with system logic such as a cache memory 102, a Mobile peripheral component interconnect bus Cache controller (MPC) 108 and pair of Mobile Data Buffers (MDB) 104. The cache memory 102 is a conventional cache memory for the processor 100 and preferably is comprised of high speed synchronous burst static Random Access Memories (RAM). The MPC 108 provides an interface to the cache memory 102 which includes tag RAMs and other logic for creating various cache ways, size, and speed configurations of the cache memory 102.

The MPC 108 and the MDB 104 also couple to a main memory 106 and a peripheral component interconnect (PCI) bus 112. The reader is assumed to be familiar with the PCI bus or the PCI specification incorporated by reference in the background of this specification. The MPC 108 provides address and control to main memory 106, which is comprised of up to 256 MByte of conventional dynamic random access memories (DRAMs). The MDB 104 provides a 64-bit data path between the host bus 110 and the main memory 106 and provides a 32-bit data path to the PCI bus 112. The MPC 108 and MDB 104 are proprietary devices having three major functional interfaces: a processor/cache interface, a main memory interface, and a PCI bus interface. The MDB 104 is responsible for buffering data between the three interfaces while MPC 108 is responsible for handling addressing, command and control. Each of these interfaces operate independently from the other and include queues for read and write posting between any two of the three interfaces. The processor/cache interface allows the processor 100 to pipeline cycles into read cycles and allows snoop accesses to the tag RAM to occur while the pipeline cycles are executing. The memory interface controls the main memory 106 and generates control signals to the MDB 104. The interface also allows read ahead operations for those PCI masters issuing a read multiple command. The PCI interface allows MPC 108 to act as a PCI master when the processor 100 is accessing the PCI bus 112, or as a PCI slave when a PCI device accesses main memory 106.

The PCI bus 112 provides a communications conduit between the laptop computer L and the expansion base E. A portion 112a of the PCI bus 112 resides in the laptop computer L and includes a quickswitch 146 for each signal of the PCI bus 112. The quickswitches 146 are low loss series in-line MOSFET devices with the gate connected to a docking detection means for providing hot plug capabilities. When the laptop computer L is docked into the expansion base E, a portion 112b of the PCI bus 112 in the expansion base E is coupled to the portion 112a to provide an extended PCI bus 112.

In the laptop computer L, the PCI bus 112a further couples to a video graphics controller 114, a cardbus interface 116 (particularly 116a) and a mobile integrated system controller (MISC) 118 (particularly 116b). In the expansion base E, the PCI bus 112b further couples to a second MISC 118 (particularly 118b), two PCI slots 148, and a second cardbus interface 116 (particularly 116b). The video graphics controller 114 further couples to a low power liquid crystal display (LCD) 120 or alternatively a cathode ray tube (CRT) style monitor. The cardbus interface 116 includes DMA capabilities and is provided for communicating with add-on cards 120, preferably of a personal computer memory card international association (PCMCIA) style, such as networking cards, modem cards, solid state storage cards and hard disk storage cards. Of particular interest are the DMA capabilities contained in the cardbus interface 116 since, as will be discovered below, these features overcome the prior art limitations. It is noted that although the preferred embodiment includes the cardbus interface, any input/output device requiring DMA is capable of residing on the PCI bus or VL-bus according to the present invention. The MISC 118 provides an industry standard architecture (ISA) bus 138 or 140, and an integrated drive electronics (IDE) hard drive interface for communicating with hard drives 122. The MISC 118 is configurable based on an input pin for use in both the laptop computer L, as MISC-L 118a, and expansion base E, as MISC-E 118b. Thus, two MISC devices, 118a and 118b are coupled to the PCI bus 112, with MISC-L 118a coupled to the PCI bus portion 112a and MISC-E 118b coupled to PCI bus portion 112b. MISC-L is further coupled to the internal ISA bus 138 while MISCE is coupled to the external ISA bus 140. The reader is assumed to be familiar with the ISA bus.

As the general functionality of MISC-L 118a and MISC-E 118b are very similar, at this point they are discussed together for simplicity. The MISC 118 bridges the PCI bus 112 to the ISA bus 138/140 and acts as both a master and slave on the PCI bus 112 and a bus controller on the ISA buses 138 and 140. The MISC 118 further includes a PCI bus arbiter, an ISA bus arbiter, 8237 compatible direct memory access (DMA) controllers, an enhanced DMA controller for fast IDE hard drives, 8254 compatible timers, an 8259 compatible interrupt controller, hot docking support logic, system power management logic, and plug and play support (all not shown in FIG. 2). Of particular interest to the present invention are the DMA controllers of MISC 118 which are more fully described below. Some components will be disabled upon initialization by software to prevent conflicts or duplication. In MISC 118 there is also a serial interrupt interface 144 for serially passing interrupts from MISC-E 118b to MISC-L 118a which provides an interrupt architecture for supporting standard ISA interrupts in a PCI based system.

The MISC 118 and the ISA buses 138 and 140 provide support for standard ISA peripherals such as those combined in a mobile super input/output (MSIO) 124 peripheral. The MSIO 124 peripheral is a proprietary chip having a combination of standard ISA peripherals, such as: a 146818 compatible real time clock (RTC), a floppy controller for interfacing to standard floppy drives 130; an 8051 compatible microcontroller for communicating with a standard keyboard 132 and pointing device 150, for performing scanning and key code conversions on the keyboard 132, and for performing power management functions; a universal asynchronous receiver transmitter (UART) for providing standard serial ports 136; and parallel port logic for a parallel port 134. A read only memory (ROM) 126 couples to the MSIO 124 for providing code to the 8051 microcontroller. Additionally, the ROM 126 provides basic input/output services (BIOS) code to the processor 100 which is copied from the ROM 126 and shadowed in main memory 106 upon system initialization so that thereafter the 8051 microcontroller may access the ROM 126. A serial bus 152 is provided for communicating information relating to power management and hot docking.

In the laptop computer L, a modem and audio peripheral 128 is also provided and coupled to the ISA bus 138. The modem and audio peripheral 128 includes a standard telephony communications port for coupling to a telephone T, and an interface for coupling to a pair of stereo speakers S. In the expansion base E, three ISA expansion slots 142 are provided for standard ISA cards.

Figure 3:
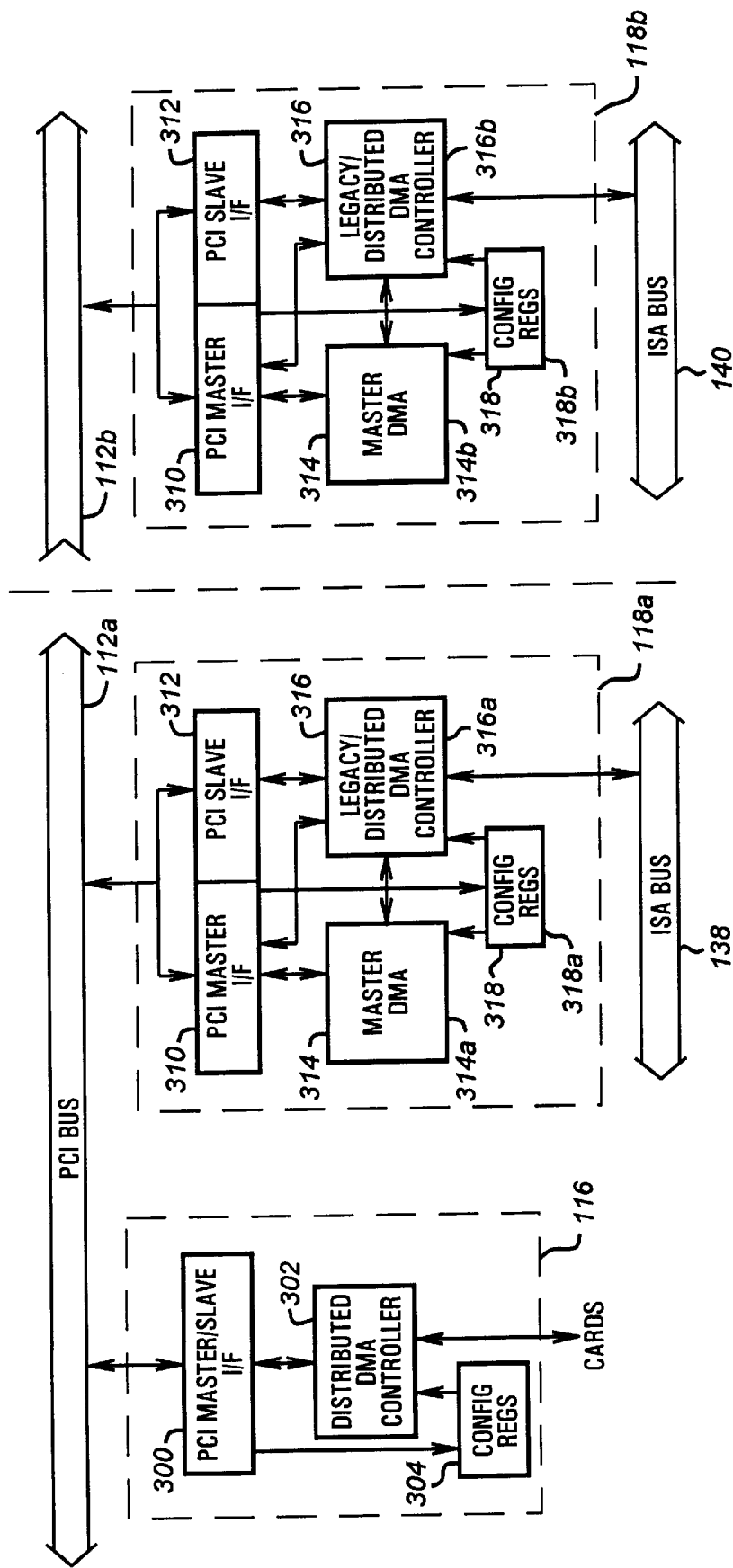
FIG. 3 is a more detailed block diagram illustrating the DMA master and the distributed DMA Slave controller of FIG. 2 according to the preferred embodiment.

Now turning to FIG. 3, there is illustrated a more detailed block diagram showing the cardbus interface 116, MISC-L 118a and MISC-E 118b. The cardbus interface 116 includes a distributed DMA controller (DDMA) 302 which couples to the PCI bus 112 through a PCI master/slave interface 300. The DMA functionality is provided by the DDMA 302 to the connected cards 120. The distributed DMA 302 is configured according to a plurality of configuration registers 304, which are described below and are in addition to the 8237 compatible registers (not shown). The distributed DMA 302 can perform as a PCI bus master and through the PCI master interface 300 the DDMA 302 performs DMA transfers on the PCI bus. Input/output cycles to the DDMA 302 are handled according to a special translation method described below. The term distributed DMA controller is a general term used herein to indicate DMA controllers having the capabilities of the present invention. Distributed DMA controllers are compatible with 8237 DMA controllers, but are independent and have the enhanced features disclosed herein. The methods disclosed herein are also applicable beyond the preferred embodiment.

As described above, the MISC-L 118a and MISC-E 118b provide identical features, however software may enable and disable certain features to avoid conflicts or duplication. Since the MISC-L 118a and MISC-E 118b are similar, they are described together with the differences duly noted. The MISC 118 resides on the PCI bus 112 and performs as both a PCI slave and PCI bus master. Accordingly, a PCI master interface 310 and PCI slave interface 312 are provided for these purposes.

The MISC 118 contains a DMA controller 316 which is configurable, according to configuration registers 318, to operate as either a legacy DMA controller (legacy DMA controller 200) or a distributed DMA controller (such as DDMA 302). In the legacy DMA controller configuration, the DMA controller 316 provides DMA transfers over the ISA bus as described in FIG. 1A and 1B. Of interest to the present invention, however, is the distributed DMA configuration, and therefore from this point on, DMA controller 316 is assumed to be configured as a DDMA.

Both MISC-L 118a and MISC-E 118b have a DMA master 314 which is coupled to the distributed DMA 316. It is the function of the DMA master 314 to translate PCI input/output cycles directed to the legacy DMA controller 200 into PCI input/output cycles recognizable by the distributed DMA's 302 and 316. Since the DMA master 314 responds to all legacy DMA controller cycles, only one of the DMA masters 314a and 314b are enabled, preferrably 314a. Thus, the DMA master 314a supports all seven channels of the legacy DMA controller 200. Accordingly, the distributed DMA 316, particularly 316b, is coupled to the PCI slave interface for receiving cycles from the DMA master 314a. Distributed DMA controller 316a communicates directly with DMA master 314a and no PCI cycles are driven. The distributed DMA 316 is also coupled to the PCI master interface 310 for performing DMA transfers over the PCI bus 112 as a bus master. It is noted that any PCI master may communicate with the input/output registers of the distributed DMA controllers 302 and 316. As such, it is contemplated that the DMA master 314 could be located in any PCI mastering device, such as the MPC 108.

Now also referring to FIGS. 4A and 4B, it is revealed that the distributed DMA controller 302 is logically comprised of two DMA slave channels 400 and that the distributed DMA controller 316 is logically comprised of seven DMA slave channels 400. Each DMA slave channel 400 compatibly functions as one channel of the legacy DMA controller 202, but each DMA slave channel being independent of each other, allows the channels to be distributed in separate PCI devices. This has the effect of breaking the legacy DMA controllers 200 into separate channels, existing in different PCI devices. Thus, the present invention allows this separation, and yet to the operating system and application software there is still the appearance of the cascaded legacy DMA controllers 200. Hence, the DMA master appears to software as the legacy DMA controller 200.

Figure 5:
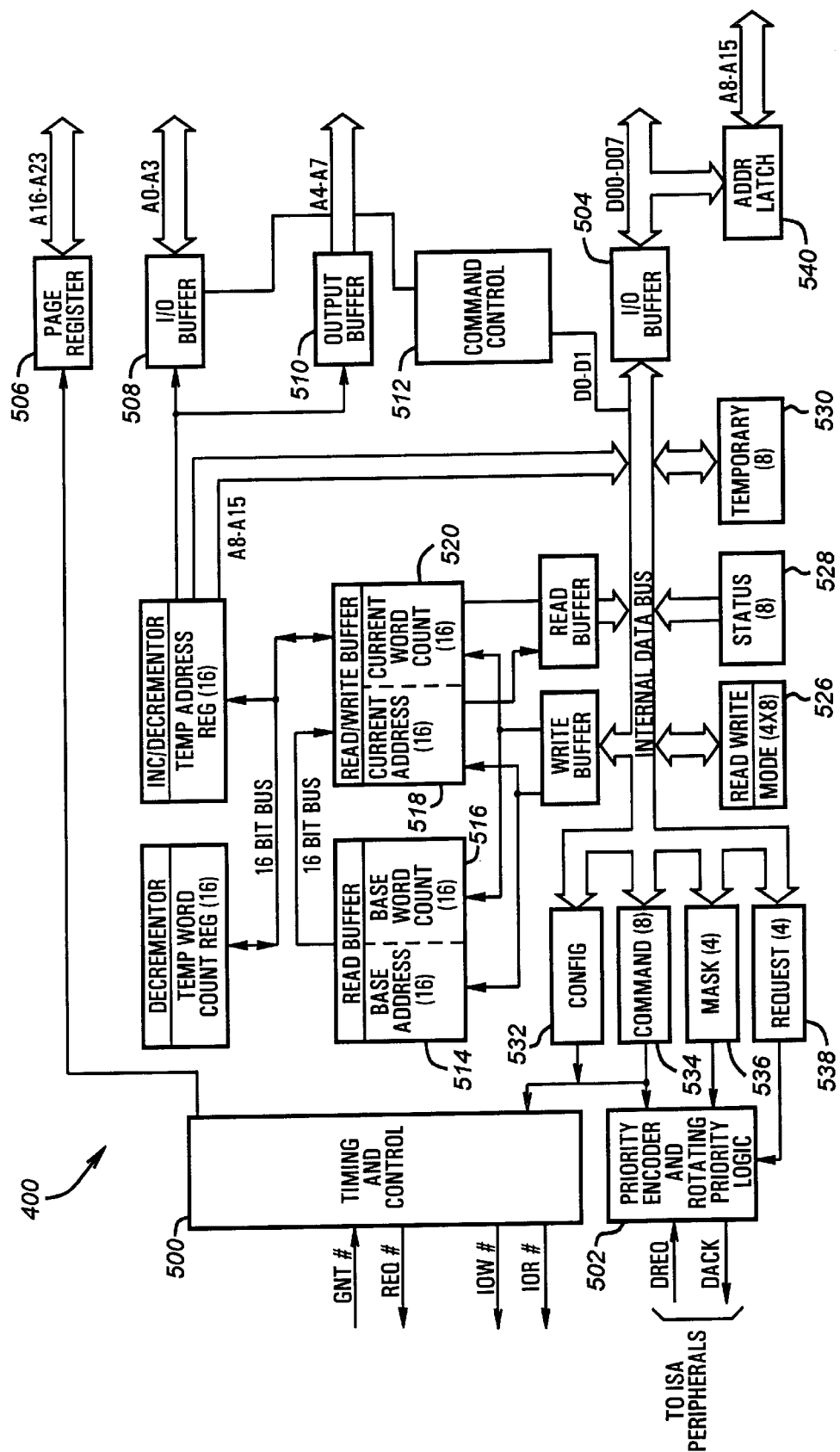
FIG. 5 is a detailed block diagram of a distributed DMA Slave controller according to the preferred embodiment.

Now referring to FIG. 5, there is a more detailed block diagram of the distributed DMA controller's 302 and 316 showing a logical representation of each DMA slave channel 400. To be compatible with the legacy DMA controller 200, each DMA slave channel 400 supports certain registers of the legacy DMA controller 200, specifically, a command register 534, a status register 528, a mode register 526, a mask register 536 and a request register 538, a base address register 514, current address register 518, base word count register 516, current word count register 520, a page register 506 and a master clear register (not shown).

The DMA slave channel 400 interfaces to the PCI bus 112 through a timing and control logic block 500, a latch 540 and an I/O data buffer 504. The PCI interface is responsive as a PCI master or slave. When the DMA slave channel 400 is receiving commands from a PCI bus master, such as the processor via MPC 108 and MDB 104, the DMA slave channel is a PCI slave device. When the DMA slave channel 400 is performing DMA transfers, such as when a card 120 requests data from main memory 106, the DMA slave channel 400 is a PCI bus master device. Commands are received into the DMA slave channel 400 through the I/O data buffer 504 and decoded by a command control logic block 512. When a DMA operation is performed, the memory address is driven by the DMA slave channel 400 by the output buffer 510, the I/O buffer 508, the latch 502 and the page register 506. For word transfers, the DMA slave channel 400 is not connected to the least significant address bit, so I/O buffer 508, output buffer 510 and latch 540 drive the A1–A16 address lines of the PCI address bus instead of the illustrated A0–A15 lines. The latch 540 receives the upper 8 bits of the 16-bit address provided by the DMA slave channel 400 from the I/O data buffer 504. The priority encoder and rotating priority logic block 502 further handles access requests to the PCI bus 112, via conventional PCI request (REQ#) and PCI grant (GNT#) signals.

The DMA slave channel 400 interfaces to the ISA peripherals, such as the floppy controller of MSIO 124, through a priority encoder 502 and the timing and control 500. DMA request signals (DREQ) are received into and DMA acknowledge signals (DACK) are provided from the priority encoder and rotating priority logic block 502 for resolving priority contention if more than one channel is requesting service simultaneously of the distributed DMA controller 302 or 316. An input/output write signal (IOW#) and input/output read signal (IOR#) are provided by the timing and control logic 500 to control DMA read and write operations with the peripheral. Other variations of interfacing to the peripherals are contemplated, especially if an ISA bus is not supported and peripherals are fully contained within devices coupled to the PCI bus 112. More details on the registers described above are found in the Intel datasheets incorporated by reference.

Each DMA slave channel 400 has the above described registers in a block of 16, 8-bit registers, as defined in Table 1, to provide compatibility with the legacy DMA controller 200. However, this block is locatable anywhere in the input/output space of the laptop computer L, by programming a base address in a DMA slave configuration register, as defined in Table 2. Thus, the DDMA 302 has two DMA slave configuration registers and DDMA's 316 have seven DMA slave configuration registers. Each DMA slave channel conveniently only supports one transfer size. At this point it is useful to note that although greater than seven DMA slave channels are present in the system, only seven are enabled at any one time to remain compatible. The DMA slave configuration register also contains a bit for enabling a non-legacy extended addressing mode. If enabled, the DMA slave channel 400 increases both the address registers 514 and 518; and word count registers 516 and 520 by a byte, effectively bringing the address up to 32 bits and count up to 24 bits. The extended address register is located at base address +3 and extended count register at base address +6, as illustrated in Table 1.

TABLE 1

DMA Slave Channel registers

| Slave address | R/W | Register Name |
|---|---|---|
| base + 0h | W | Base Address 0–7 |
| base + 0h | R | Current Address 0–7 |
| base + 1h | W | Base Address 8–15 |
| base + 1h | R | Current Address 8–15 |
| base + 2h | W | Base Address 16–23 |
| base + 2h | R | Current Address 16–23 |
| base + 3h | W | Base Address 24–31 |
| base + 3h | R | Current Address 24–31 |
| base + 4h | W | Base Word Count 0–7 |
| base + 4h | R | Current Word Count 0–7 |
| base + 5h | W | Base Word Count 8–15 |
| base + 5h | R | Current Word Count 8–15 |
| base + 6h | W | Base Word Count 16–23 |
| base + 6h | R | Current Word Count 16–23 |
| base + 7h | N/A | Reserved |
| base + 8h | W | Command |
| base + 8h | R | Status |

TABLE 1-continued

DMA Slave Channel registers

| Slave address | R/W | Register Name |
|---|---|---|
| base + 9h | W | Request |
| base + Ah | N/A | Reserved |
| base + Bh | W | Mode |
| base + Ch | W | Reserved |
| base + Dh | W | Master Clear |
| base + Eh | N/A | Reserved |
| base + Fh | R/W | Multi-Channel Mask |

TABLE 2

DMA Slave Configuration register

| Bits | Description |
|---|---|
| 0-0 | Channel Enable<br>0 disabled<br>1 enabled |
| 1-2 | Transfer Size<br>00 = 8 bit transfer<br>01 = 16 bit transfer<br>10 = 32 bit transfer, non Legacy<br>11 = reserved |
| 3 | Non Legacy Extended Address<br>0 = disabled<br>1 = enabled |
| 4-15 | Slave Base Address 15-4 |

As described above, the DMA master 314a is responsible for translating legacy compatible cycles into DMA slave cycles, thereby preserving compatibility via the DMA master. The DMA master 314a has a DMA master configuration register (configuration registers 318a) which includes a bit for enabling the DMA master, as shown in Table 3. The default condition is disabled, whereby the legacy/distributed DMA controllers 316 would be used in the legacy configuration and legacy/distributed DMA controller 316b would be rendered unusable. The DMA master 314a also contains a number of registers (configuration registers 318a) corresponding to the DMA slave configuration registers so that the DMA master may identify where each DMA slave channel 400 is located, as shown in Table 4. Preferably, each DMA slave channel 400 has a corresponding register in the DMA master 314a so that each DMA slave channel can be mapped anywhere in the input/output space of the laptop computer L. Alternatively, the 16 byte registers of all DMA slave channels could be grouped into a single 128 byte block extending from a single base address.

TABLE 3

DMA Master Configuration Register

| Bits | Description |
|---|---|
| 31 | Master DMA Enabled<br>0 disabled<br>1 enabled |
| 30-8 | RESERVED always reads 0's |
| 7-5 | Identifies active DMA channel in MISC PCI device. One bit per channel.<br>0 Distributed Legacy DMA Channel<br>1 Local Legacy DMA Channel |
| 4 | RESERVED always reads 0's |
| 3-0 | Identifies active DMA channel in MISC PCI device. One bit per channel. |

TABLE 3-continued

DMA Master Configuration Register

| Bits | Description |
| --- | --- |
| | 0 Distributed Legacy DMA Channel |
| | 1 Local Legacy DMA Channel |

TABLE 4

DMA Slave Configuration Registers

| Bits | Read/Write | Description |
| --- | --- | --- |
| 31-19 | R | RESERVED always return's 0's |
| 15-7 | W/R | Slave Base Address where the 16 byte block of programming register for this channel exist |
| 6-4 | R | 001 - DMA Channel 1 Slave Lower Address (6-4) Defines the start of the 16 byte block of I/O addresses for Channel 1 |
| | | 010 - DMA Channel 2 Slave Lower Address (6-4) Defines the start of the 16 byte block of I/O addresses for Channel 2 |
| | | 011 - DMA Channel 3 Slave Lower Address (6-4) Defines the start of the 16 byte block of I/O addresses for Channel 3 |
| | | 101 - DMA Channel 5 Slave Lower Address (6-4) Defines the start of the 16 byte block of I/O addresses for Channel 5 |
| | | 110 - DMA Channel 6 Slave Lower Address (6-4) Defines the start of the 16 byte block of I/O addresses for Channel 6 |
| | | 111 - DMA Channel 7 Slave Lower Address (6-4) Defines the start of the 16 byte block of I/O addresses for Channel 7 |
| 3 | W/R | Non Legacy Extended Addressing RESERVED always return's O'sO = enabled 1 = enabled |
| 2-1 | W/R | Transfer Size 00 = 8 bit transfer 01 = 16 bit transfer 10 = RESERVED 11 = RESERVED |
| 0 | R | Channel slave interface active bit. When set to a 1, the distributed DMA Slave will accept PCI cycles to the programmed address in bits 4-15 (Dual port register with the DMA Master Configuration Register) |

Figure 4:
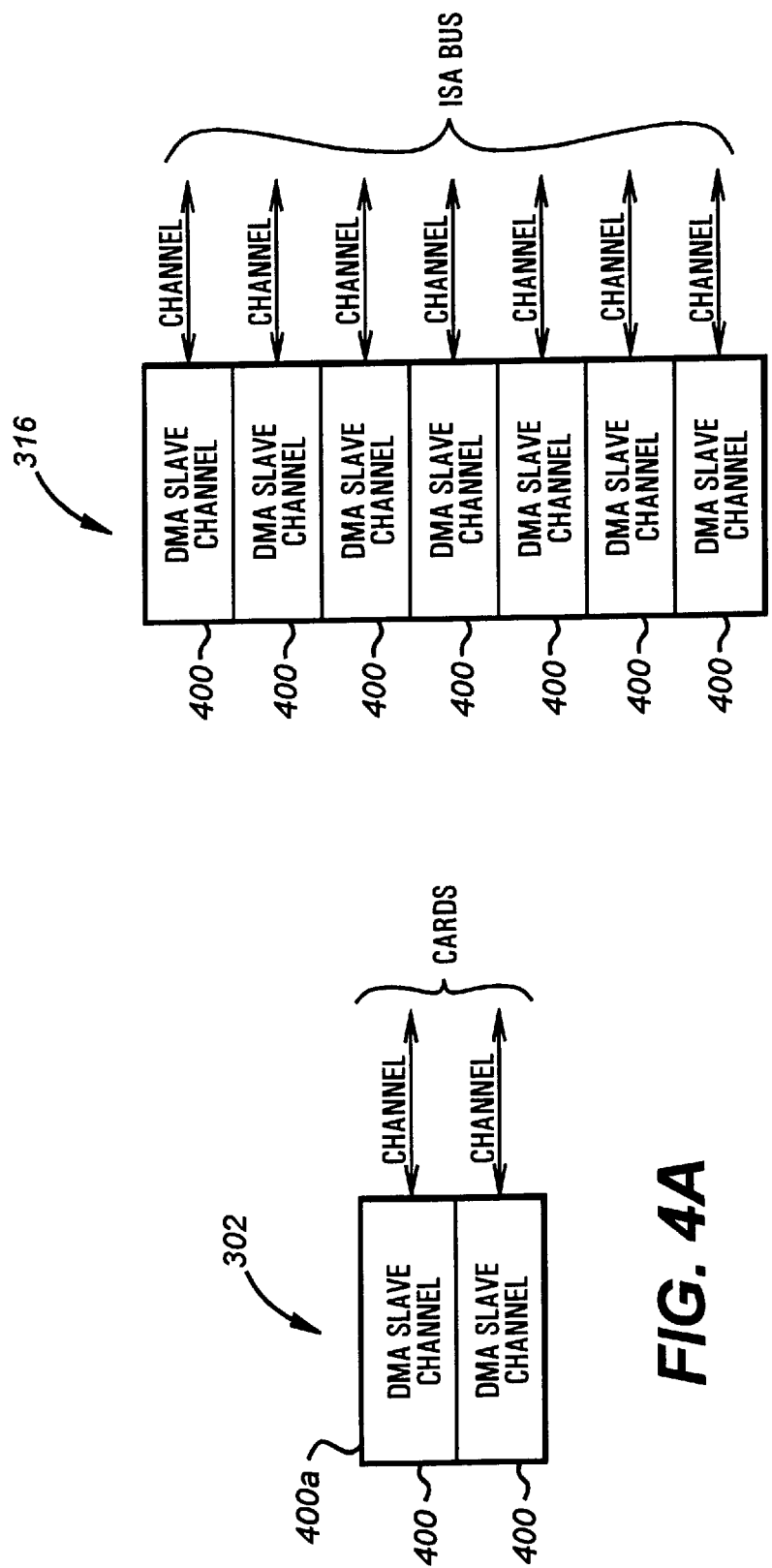
FIGS. 4A and 4B are block diagrams of the distributed DMA Slave controllers of the cardbus I/F and MISC respectively.
Figure 6A:
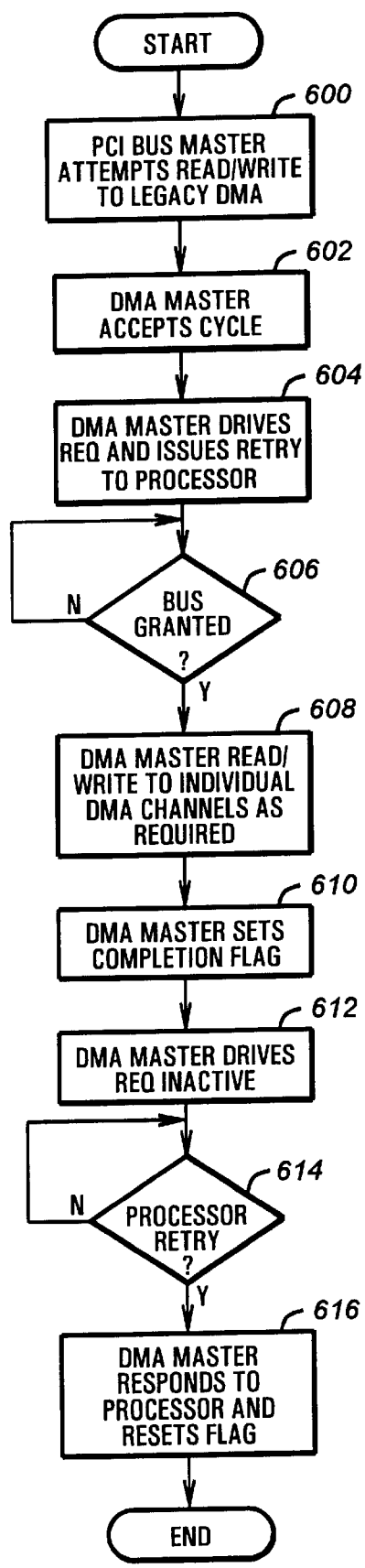
FIGS. 6A and 6B are a flow diagrams illustrating a PCI bus master read/write operation to a legacy DMA controller address as performed by the distributed DMA architecture of the present invention.

Now turning to FIG. 6A and with reference to FIGS. 2–4, a typical I/O read/write operation to the distributed DMA controllers 302 and 316 will be described according to the preferred embodiment. It is noted that the conventional PCI signals described herein use a notation "#" to represent an active low signal. The reader is referred to the PCI Specification for further information on specific PCI signals. At step 600 the processor 100 initiates an I/O read/write cycle using compatible I/O addresses of the legacy DMA controllers 200. The I/O addresses for the legacy DMA controllers 200 are well known in the art, but are also reproduced below in Table 5.

TABLE 5

LEGACY DMA I/O ADDRESS

| I/O ADDRESS RANGE | FUNCTION |
| --- | --- |
| 000 - 01F | DMA Controller 202d (byte transfers) |
| 080 - 08F | DMA PAGE REGISTERS |
| 0CD - 0DF | DMA CONTROLLER 202c (word transfers) |
| 08O - 08F | Extended Page Registers |

At step 602, the DMA master 314a, recognizing that the operation is a legacy DMA cycle, accepts the cycle. Cycles are conventionally accepted on the PCI bus 112 by driving a device select signal (DEVSEL#, not shown). As 314a is enabled and 314b is disabled, only 314a responds. At step 604 and after the DMA master 314a has received the command (IRDY# asserted), the DMA master 314a issues a retry to the processor 100 to force the processor 100, or actually the PCI/cache/memory controller 108, off the PCI bus 112. Cycles are conventionally retried with a STOP# signal, and particular timing depends upon whether or not data is accepted. At approximately the same time the DMA master 314a requests the PCI bus 112. At step 606, the DMA master 314a waits for the PCI bus 112 to be granted. When access of PCI bus 112 is granted to the DMA master 314a, the DMA master 314a determines which of the DMA slave channels 400 are targeted and thereafter reads/writes to the individual DMA slave channels registers, as shown in step 608. The DMA master 314a will perform up to four read/writes to the DMA slave channels 400, corresponding to the four byte-wide or three word-wide channels. If the DMA master 314a is reading from individual DMA slave channels 400, such as the status register 528, the data is merged into a single byte to provide a compatible response to the processor. If the DMA master 314a is writing to individual DMA slave channels 400, the number of write cycles is dependant upon which channels are effected by the write cycle. For example, a new command register value for DMA1 202 will be written to all the DMA slave channels 400 corresponding to the byte-wide channels 3-0, whereas a new mask register value will only be written to one of the DMA slave channels. Further details on the construction and decoding of legacy DMA controller registers is contained below in the DMA control register descriptions.

Therefore, the DMA master 314a is controlled by the processor 100, and the DMA slave channels 400 are slaved to the DMA master 314a. It is the responsibility of each DMA slave channel 400 to respond and terminate a PCI I/O read/write to its registers. Hence, each register of each individual DMA slave channel 400 is addressable according to the address maps of Tables 6–14. The bit descriptions and positions for each register are compatible with the 8237 unless otherwise noted.

Once each effected DMA slave channel 400 has returned the requested information or the DMA master 314a has written the information to the effected DMA slave channel(s) 400, at step 610 the DMA master 314a sets an internal completion flag to indicate completion. The DMA master 314a then relinquishes control of the PCI bus 112, by deasserting the request signal (REQI), as shown at step 612. At step 614 the DMA master 314a waits for the processor 100 to retry the legacy DMA I/O read/write cycle. At step 616, when the processor 100 retries the transaction, the DMA master 314a now having completed its communications with the individual DMA slave channels 400, thereby responds to this second request. If the request was a read directed to the legacy DMA controller 200, then the data is provided. If the request was a write operation directed to a legacy DMA controller 200, then a completion indication is provided, the write data having actually been sampled on the first attempt. When responding, the DMA master 314a resets the completion flag. Thereby, compatibility to the legacy DMA controllers 200 is achieved through the master/slave method disclosed above. It is contemplated that this method is useful for other applications requiring compatibility or isolation.

The DMA master 314a supports the programming model of the legacy DMA controller 200 through a plurality of control registers, described below in Tables 6–14. Since there are both byte-wide and word-wide DMA controllers in the laptop computer L, there are two registers for each register defined. Also, since the DMA master 314a translates legacy cycles to DMA slave cycles, two sets of input/output addresses are defined.

Figure 6B:
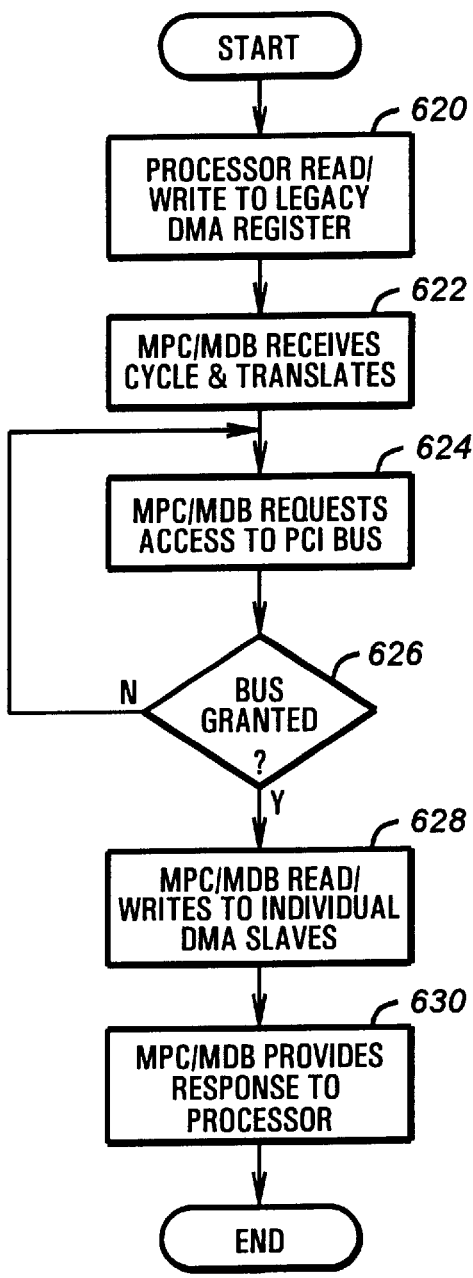

Now referring to FIG. 6B, there is illustrated an alternative method of accessing the DMA slaves 302 and 316. FIG. 6B corresponds to an alternative embodiment, mentioned above, in which the DMA master 314 would be contained in MPC 108 and MDB 104 (MPC/MDB). In such a configuration, the processor 100 would provide the access cycle to the MPC/MDB using the legacy addresses, as shown at step 620. The MPC/MDB receives the cycle and before passing the cycle to the PCI bus 112, the MPC/MDC translates the cycle into at least one bus transaction directed to one of the individual DMA slave channel 400 registers at its corresponding address. The MPC/MDB requests access to the PCI according to PCI conventions, as shown at steps 624 and 626. After control has been granted, at step 628, the MPC/MDB accesses the request register. The number of bus transactions is dependant upon whether the cycle is a read or a write, and which register is being accessed. Details on the suggested number of cycles are contained below in Tables 6–14. Each DMA slave channel 400 being accessed provides a response to MPC/MDB. The response is similar to that described steps 608 and 610 of FIG. 6A. At step 630 the MPC/MDB provides the received responses to the processor 100. Thus, in this alternative method, the retry operation is not needed since the DMA master is placed between the processor 100 and the DMA slave channels 400. It is useful to note, however, that if another PCI master requests access to the DMA channel slaves 400 by using a legacy address, a retry operation, such as described in FIG. 6A would be necessary.

Figure 7A:
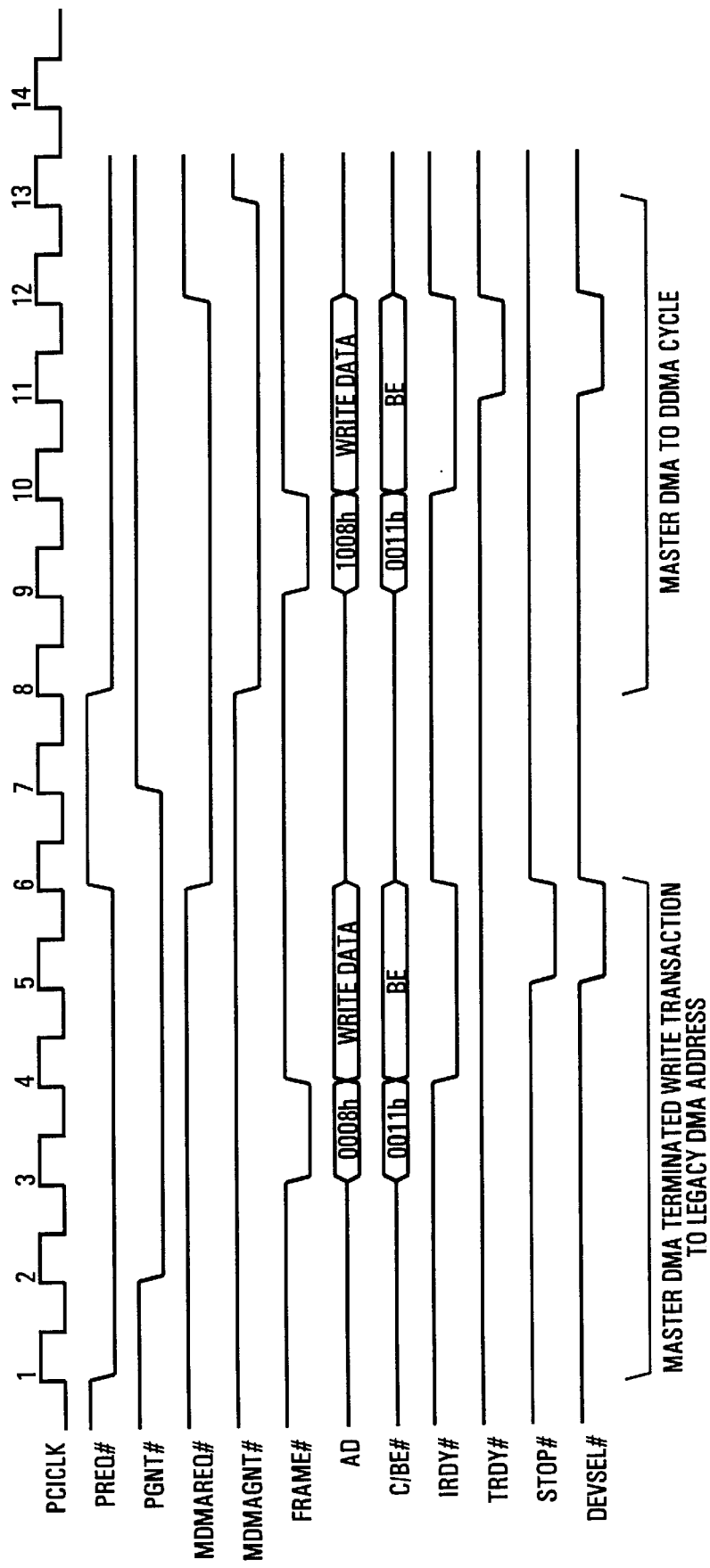
FIGS. 7A and 7B are timing diagrams illustrating a PCI bus master write operation to a legacy DMA controller address as performed by the distributed DMA architecture of the present invention.
Figure 7B:
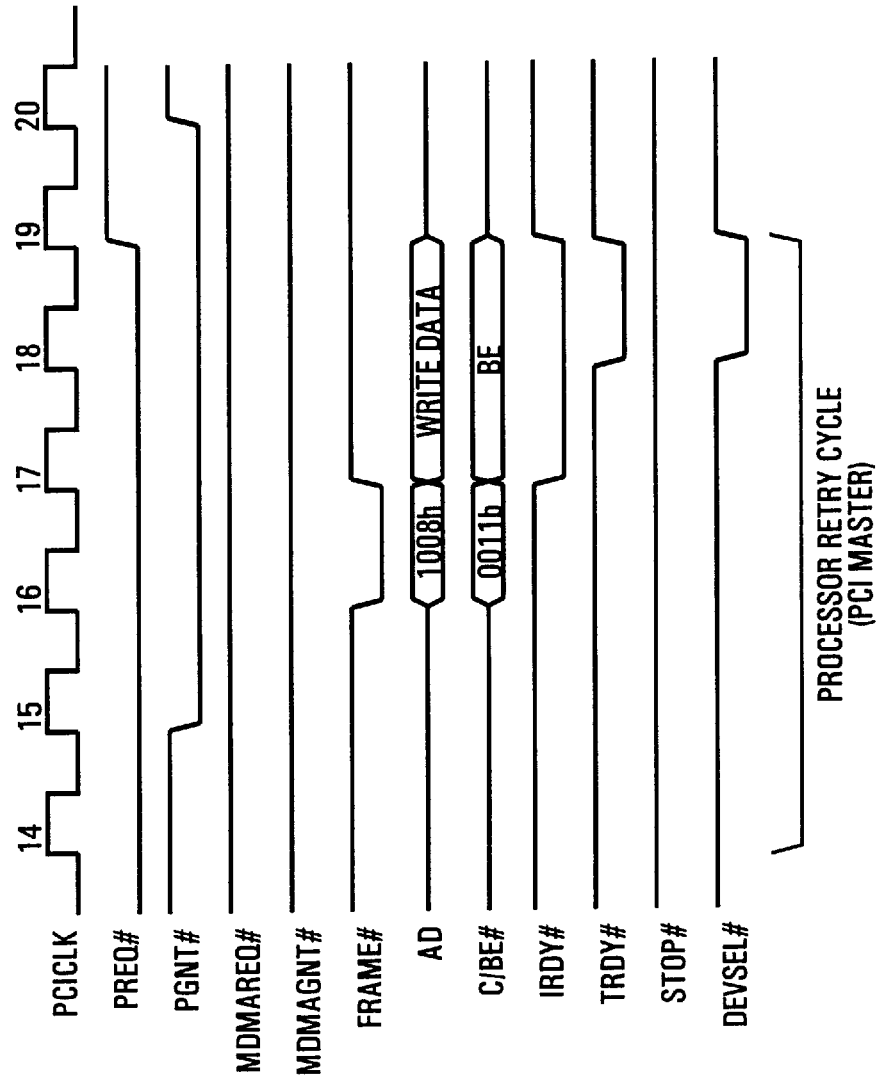

Now referring to FIGS. 7A and 7B, a write transaction directed to the command register of the byte-wide legacy DMA controller 202 is illustrated. Recalling that the command register is a shared register and that the byte-wide DMA controller functionality may be distributed among up to four DMA slave channels 400, the single write transaction directed to the legacy DMA controller 202 address may result in up to four write transactions to the DMA slave channels 400. In the example of FIGS. 7A and 7B, it is assumed that channel 0 has been assigned to the distributed DMA controller 302 with one of the two DMA slave channels 400 being having the assignment. DMA channels 1–3 are assumed disabled for simplicity.

In the following description, it is noted that although reference is to the processor providing the PCI signal, the MPC 108 and MDB 104 acting as PCI bus masters actually drive the PCI signal, but reference is made to the processor simply because it is the source. Furthermore, any PCI bus master may direct read/write cycles to the legacy DMA controllers 200 with similar results. One skilled in the art would also appreciate that although the preferred embodiment provides the DMA master 314a in the MISC 118, an alternative is to place the DMA master closer to the processor 100, such as in the MPC 108/MDB 104.

At clock 1 of FIG. 7A, the processor 100 causes a processor PCI bus access request (PREQ#) signal to be asserted, intending to write a value into the command register of the byte-wide legacy DMA controller 202. At clock 2 the arbiter of the MISC-L 118 provides a grant (PGNT#) signal to the processor 100 to indicate that the processor has been granted access to the PCI bus 112. According to the PCI bus specification, a frame (FRAME#) signal is asserted to indicated the beginning of a transaction, as shown at clock 3. At the same time the processor 100 causes an address to be placed on an address/data portion of the PCI bus 112 and a PCI command to be placed on a command/byte enable portion of the PCI bus 112. The address 0008h indicates the input/output address of the legacy DMA controller 202 command register. The PCI command indicates that the operation is a I/O write operation. At clock 4 the FRAME# signal is deasserted since only one data phase is needed. Also at clock 4 the initiator ready (IRDY#) is asserted by the processor 100 to indicate that data is available to be written.

According to the preferred embodiment, only DMA master 314a responds to legacy DMA addresses when configured in distributed DMA configuration. However, since the registers of the DMA slave channels 400 are distributed among several devices, the DMA master may need to communicate with the DDMA controllers before the transaction can be successfully completed. This is especially true where the processor is requesting a certain channel register to be read. Therefore, at clock 5 the DMA master 314a asserts a device select (DEVSEL#) signal to claim the transaction and asserts a stop (STOP#) signal to terminate the transaction and cause it to be retried. Although the transaction is terminated, if the transaction is a write transaction, the DMA master 314a latches the data at clock 6.

At clock 6, since IRDY# and STOP# are asserted, the processor must cause the PREQ# signal to be deasserted for at least two clock cycles so that another device may have access to the PCI bus 112. At clock 7 the PGNT# is deasserted following the deasserted PREQ# signal.

At clock 6 the DMA master 314a requests access to the PCI bus 112 by asserting its request (MDMAREQ#) signal. Sometime later, the arbiter of MISC-L 118a will provide a grant (MDMAGNT#) signal to the DMA master 314a, as shown in clock 8.

At clock 9 the DMA master 314a begins to process the requested write transaction. The DMA master 314a provides an address, for example 1008h, and PCI bus command and causes the FRAME# signal to be asserted. In this operation from the DMA master 314a to the DMA slave channel 400, the I/O address is 1008h to indicate the command register associated with channel 0. Since DMA slave channel 400a of distributed DMA controller 302 has been configured for channel 0, it is the only distributed DMA controller that will respond to this address. The distributed DMA controllers 302 and 316 only respond to the addresses associated with channels they have been configured for. While a particular DMA slave channel knows its addresses, it is not necessary for it to know which channel number it is.

At clock 10 the DMA master 314a provides the write data received from the processor 100 to the DMA slave channel 400a. The byte enable (BE) signals indicate that only one byte is present. The initiator ready (IRDY#) signal is provided by the DMA master 314a to indicate that the data is available. At clock 11 the DMA slave channel 400a claims the transaction by asserting the device select (DEVSEL#) signal and accepts the data by asserting the target ready (TRDY#) signal. The write data is latched into the DMA slave channel command register at clock 12 and the transaction is completed. It is noted that if channels 0, 1 or 3 were enabled and configured in a second distributed DMA controller, such as distributed DMA controller 316b, three more write cycles would be performed for writing the command register to those DMA slave channels at their corresponding addresses. After the DMA master 314a has communicated with all of the DMA slave channels 400, the MDMAREQ# signal is deasserted, as shown at clock 12. The deassertion of the MDMAGNT# signal follows at clock 13.

At clock 15 the processor 100 reacquires the PCI bus 112 when the PGNT# signal is asserted. The cycle of clocks 2–4 are retried, as shown in clocks 15–17. However, this time since the DMA master 314a has completed the write transaction to the relevant DMA slave channels 400, the completion flag will be set. This causes the DMA master 314a to claim the cycle, by asserting the DEVSEL# signal, and complete the cycle, by asserting the TRDY# signal. If the cycle is a read, data will be provided to the processor 100. If the cycle is a write, the cycle will terminate successfully indicating to the processor that the write cycle was performed. At clock 19, the assertion of IRDY# and TRDY# indicate the cycle is completed and the PREQ# signal is accordingly deasserted. The PGNT# signal follows at clock 20. Thus, the processor performs cycles directed to the legacy DMA controllers 200, according to conventional operating system software, and the DMA master 314a hides the distributed DMA architecture, thereby appearing as the compatible legacy DMA controllers 200.

Figure 8:
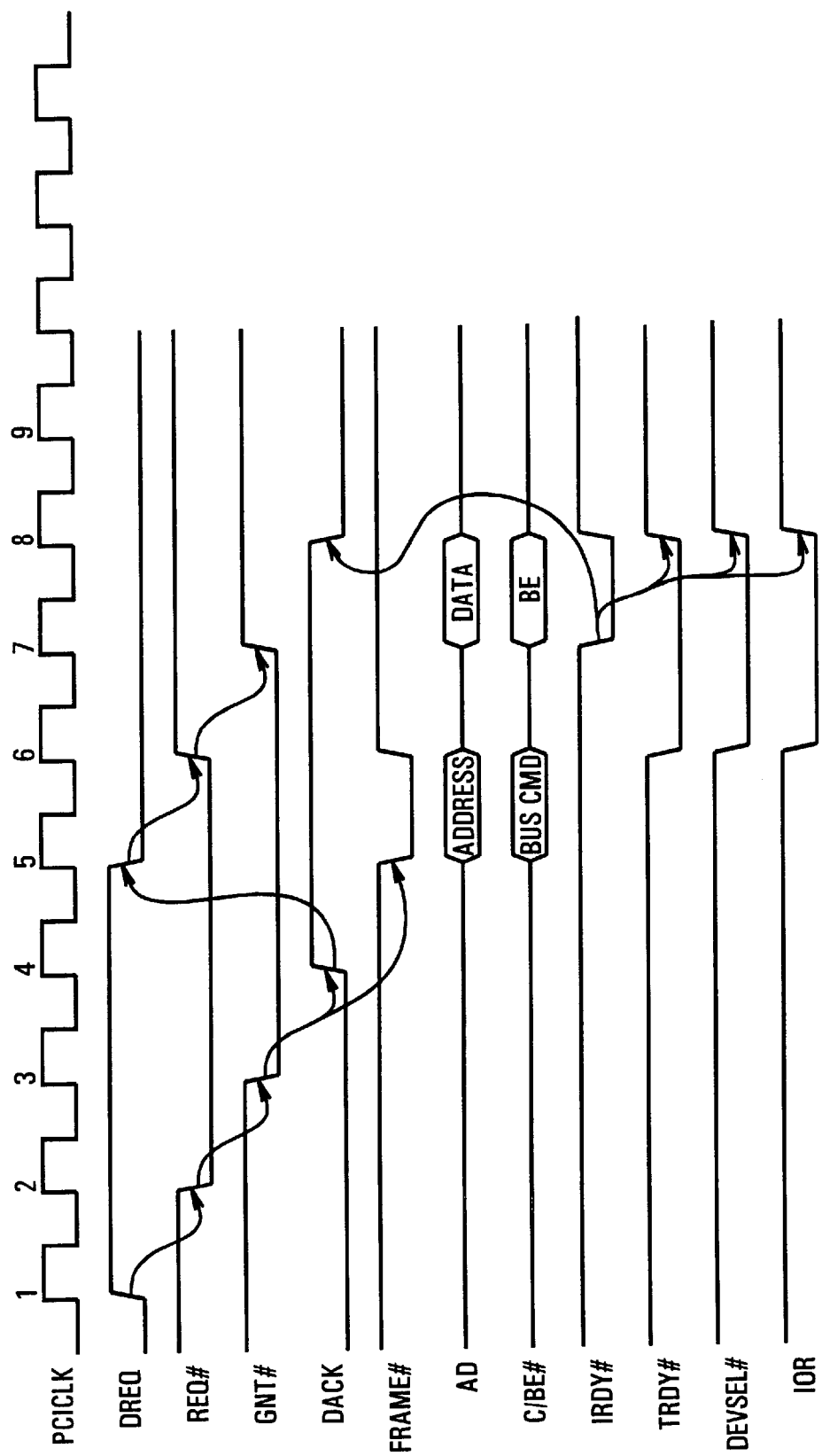
FIG. 8 is a timing diagram illustrating a DMA operation between an I/O device and main memory according to the preferred embodiment.

Now referring to FIG. 8, a typical DMA data transfer according to the preferred embodiment is illustrated. This example illustrates the timing between the DMA slave channel 400, the PCI bus 112, the target PCI device (main memory 106) and the DMA peripheral. In this example the DMA peripheral is assumed to be a card 120, such as a network card requiring DMA transfers. For this illustration, the data transfer is from the network card 120, in conjunction with distributed DMA controller 302, to the main memory 106, such as when the computer has requested data from the network.

It is understood that prior to the initiation of this operation the laptop computer L has requested the network card 120 to obtain certain data from the network (not shown). The laptop computer L instructs the network card 120 to provide the data via a DMA operation. The computer also initializes the DMA controllers to prepare for the transfer. When the computer performs the DMA initialization operation, the DMA master 314a receives the command and initializes DMA slave channel 400, according to the methods described above.

FIG. 8 illustrates a number of signals referenced to a PCI clock (PCICLK) signal. It is noted that the PCICLK is provided for illustration purposes only. Signals specific to the PCI bus are properly referenced to the PCICLK signal, but other signals, such as the DMA signals may be dependent on a different clock signal. Further, it is noted that design choices may vary the response time of certain signals, but the sequence of signals is generally as shown.

When the network card 120 is ready to transfer data to the main memory 106, a DMA request (DREQ) signal is asserted, as shown at clock 1. The DREQ signal is received by the DMA slave channel 400a and in response the DMA slave channel requests access to the PCI bus 112 by asserting a PCI bus request (REQ#) signal, as shown at clock 2. As many other PCI devices may access the PCI bus 112, the PCI bus arbiter of MISC 118a provides a bus grant (GNT#) signal to the DMA slave channel 400a at a time when the bus is available, as shown at clock 3. The DMA slave channel 400a then provides a DMA acknowledge (DACK) signal to the network card 120 to indicate bus availability.

At approximately the same time, the DMA slave channel 400a drives a memory address and PCI bus command onto the PCI bus 112. The memory address indicates where the transferred data is to be written into the main memory 106. The PCI bus command indicates that a memory write operation is occurring on the PCI bus. The DMA slave channel 400a drives a frame (FRAME#) signal to indicate the validity of these values and to initiate the PCI bus operation, as shown at clock 5.

Since in this example a single data byte is to be transferred, the DREQ signal is deasserted shortly after the DACK signal is asserted. If more than one byte was to be transferred, the DREQ signal would remain asserted until during the last byte transfer. It is noted that a DMA operation may also be terminated when a terminal count is reached. More details are found in the Intel datasheets incorporated by reference. When the DREQ signal is deasserted, the REQ# and GNT# signals are also deasserted according to PCI bus specification convention.

When the DMA slave channel 400a provides the memory address on an address/data portion of the PCI bus 112, the main memory 106 decodes the address and claims the operation by asserting a device select (DEVSEL#) signal, as shown at clock 6. If the main memory 106 is ready to receive the data, the main memory 106 provides a target ready (TRDY#) signal to indicate readiness, as shown at clock 6. According to the PCI bus specification, both the TRDY# signal and an initiator ready (IRDY#) signal must be asserted before the transaction is ended. In this example, IRDY# is not asserted yet.

Since the address and bus command are driven from the DMA slave channel 400a and the data is provided directly from the network card 120, bus contention should be avoided. Therefore, the DMA slave channel 400a does not provide an input/output read (IOR#) signal until the DMA slave channel 400a has tri-stated the bus, as shown at clock 6. At approximately the same time, the IOR# signal is provided to the network card 120 to indicate that data may be provided onto an address/data portion of the PCI bus. At a clock 7, data is provided from the network card 120. Also at clock 7, the DMA slave channel 400a provides the byte enable (C/BE#) signals to the PCI bus 112 to indicate that a single byte is provided on a lower eight bits of the PCI address/data bus. The DMA slave channel 400a, knowing the data valid timing of the network card 120, drives the IRDY# signal at clock 7 to indicate data availability to the main memory 106. At clock 8, the DACK, IRDY#, TRDY#, DEVSEL# and IORI signals are deasserted as the transfer is complete.

Thus, by distributing the functionality of the legacy DMA controllers among the peripherals that need DMA, the peripherals can be directly coupled to the PCI without sideband signals and without requiring an ISA bus.

TABLE 6

Command Register

| I/O address | Byte Device | Legacy Address | 0008h |
|---|---|---|---|
| | | Slave Address | Base + 8h |
| | Word Device | Legacy Address | 00D0h |
| | | Slave Address | Base + 3h |
| Size | | | 8 bits |
| Type | | | Write only |
| Power up | | | 00000000b |

The DMA master 314a handles write cycles to the legacy address of the command register in the special way described above. Four I/O writes are performed if the write cycle is to the byte legacy DMA controller 202 and three I/O writes are performed if the write is to the word DMA legacy controller 204. For the DMA channels 400, the function of this register is the same as for the legacy DMA controllers 200.

TABLE 7

Mode Register

| I/O address | Byte Device | Legacy Address | 000Bh |
|---|---|---|---|
| | | Slave Address | Base + Bh |
| | Word Device | Legacy Address | 00D6h |
| | | Slave Address | Base + Bh |
| Size | | | 8 bits |
| Type | | | Write only |
| Power up | | | 00000000b |

| Mode Register | Description |
|---|---|
| 0-1 | Slave - reserved, Master - Channel select<br>00 Channel 0 or 4<br>01 Channel 1 or 5<br>10 Channel 2 or 6<br>11 Channel 3 or 7 |
| 2-7 | See Intel 8237 data sheets |

Data bits 0 and 1 of the legacy DMA address of the mode register indicate which legacy channel to apply the other six bits. The DMA master 314a uses these bits to determine which DMA slave channel 400 will receive this data. The DMA master 314a handles writes to this legacy address in the same special way described above. For each individual DMA slave channel 400, data bits 0 and 1 are considered reserved and are written "undefined" by the DMA master 314a. The functionality of the remainder of this register is identical to the legacy DMA controller 200 when applicable.

TABLE 8

Request Register

| I/O address | Byte Device | Legacy Address | 0009h |
|---|---|---|---|
| | | Slave Address | Base + 9h |
| | Word Device | Legacy Address | 00D2h |
| | | Slave Address | Base + 9h |
| Size | | | 8 bits |
| Type | | | Write only |
| Power up | | | 00000000b |

| Request Register Bits | Description |
|---|---|
| 0-1 | Slave - reserved, Master - Channel select<br>00 Channel 0 or 4<br>01 Channel 1 or 5<br>10 Channel 2 or 6<br>11 Channel 3 or 7 |
| 2-7 | Not described |

Data bits 0 and 1 of the legacy DMA address of the request register indicate which legacy channel to apply the other six bits. The DMA master 314a uses these bits to determine which DMA slave channel 400 will receive the data. The DMA master 314a handles writes to this legacy address in the same special way described above. For each individual DMA slave channel 400, data bits 0 and 1 are considered reserved and are written "undefined" by the DMA master 314a. The functionality of the remainder of this register is identical to the legacy DMA controller 200 when applicable.

TABLE 9

Single Channel Mask Register

| I/O address | Byte Device | Legacy Address | 000Ah |
|---|---|---|---|
| | | Slave Address | Base + Fh |
| | Word Device | Legacy Address | 00D4h |
| | | Slave Address | Base + Fh |
| Size | | | 8 bits |
| Type | | | Write only |
| Power up | | | 00000000b |

| Single Channel Mask Register Bits | Description |
|---|---|
| 0-1 | Slave - reserved, Master - Channel select<br>00 Channel 0 or 4<br>01 Channel 1 or 5<br>10 Channel 2 or 6<br>11 Channel 3 or 7 |
| 2-7 | Not described |

Data bits 0 and 1 of the legacy DMA address of the single channel mask register indicate which legacy channel to apply the other bit. The DMA master 314a uses these bits to determine which DMA slave channel 400 will receive this data. The DMA master 314a handles writes to this legacy address in the same special way described above.

According to the preferred embodiment, each DMA slave channel 400 does not have a corresponding single channel mask register. A write to this legacy address causes the DMA master 314a to write to the multi-channel mask register (described below) in the targeted DMA slave channel 400, with bit 0 carrying the new mask status.

TABLE 10

Multi-Channel Mask Register

| I/O address | Byte Device | Legacy Address | 000Fh |
|---|---|---|---|
| | | Slave Address | Base + Fh |
| | Word Device | Legacy Address | 00DEh |
| | | Slave Address | Base + Fh |
| Size | | | 8 bits |
| Type | | | Write/Read |
| Power up | | | 00000001b |

| Multi-Channel Mask Register Bits | Description |
|---|---|
| 0 | Slave - Mask bit select, Legacy - channel 0 or 4 Mask bit select<br>0 Clear mask bit<br>1 Set mask bit |
| 1 | Slave - reserved, Legacy - Channel 1 or 5 Mask bit select<br>0 Clear mask bit<br>1 Set mask bit |
| 2 | Slave - reserved, Legacy - Channel 2 or 6 Mask bit select<br>0 Clear mask bit<br>1 Set mask bit |
| 3 | Slave - reserved, Legacy - Channel 3 or 7 Mask bit select<br>0 Clear mask bit<br>1 Set mask bit |
| 4-7 | Don't Care |

Data bit positions 0–3 of the legacy DMA address to the multi channel mask register indicate the legacy channels to apply the data to. The DMA master 314a uses these bit positions to determine the DMA slave channels 400 will receive this data. The DMA master device handles writes to this legacy address in the same special way described above. There are four I/O slave writes if the legacy address is to the byte DMA the byte legacy DMA controller 202, and there are three I/O slave writes if the legacy address is to the word legacy DMA controller 204.

It is the DMA master's responsibility to remap the legacy bits for the DMA slave channel 400 since only bit 0 is valid and the other seven bits are considered reserved and will be written "undefined".

TABLE 11

Status Register

| I/O address | Byte Device | Legacy Address | 0008h |
|---|---|---|---|
| | | Slave Address | Base + 8h |
| | Word Device | Legacy Address | 00D0h |
| | | Slave Address | Base + 8h |
| Size | | | 8 bits |

TABLE 11-continued

Status Register

| Type | Read only |
|---|---|
| Power up | XXXX0000b |

| Status Register Bits | Description |
|---|---|
| 0 | Slave - TC indication; Legacy - Channel 0 or 4 TC indication<br>0 TC has not been reached<br>1 TC has been reached |
| 1 | Slave - TC indication, Legacy - Channel 1 or 5 TC indication<br>0 TC has not been reached<br>1 TC has been reached |
| 2 | Slave - TC indication, Legacy - Channel 2 or 6 TC indication<br>0 TC has not been reached<br>1 TC has been reached |
| 3 | Slave - TC indication, Legacy - Channel 3 or 7 TC indication<br>0 TC has not been reached<br>1 TC has been reached |
| 4 | Slave - Channel request, Legacy - Channel 0 or 4 request<br>0 No request<br>1 Channel request |
| 5 | Slave - Channel request, Legacy - Channel 1 or 5 request<br>0 No request<br>1 Channel request |
| 6 | Slave - Channel request, Legacy - Channel 2 or 6 request<br>0 No request<br>1 Channel request |
| 7 | Slave - Channel request, Legacy - Channel 3 or 7 request<br>0 No request<br>1 Channel request |

The master DMA 314a handles reads to the legacy address of the status register in the same special way described above. There are four I/O slave reads if the legacy address is to the byte legacy DMA controller 202, and there are three I/O slave reads if the legacy address is to the word legacy DMA controller 204. It is the DMA master's responsibility to properly assemble the contents of this register. To facilitate assembly, each DMA slave channel returns the same TC indication on bits 0–3 in the same channel request indication on bits 4–7.

TABLE 12

Clear First/Last Flip-Flop

| I/O address | Byte Device | Legacy Address | 000Ch |
|---|---|---|---|
| | | Slave Address | N/A |
| | Word Device | Legacy Address | 00D8h |
| | | Slave Address | N/A |
| Size | | | 1 bit |
| Type | | | Write only |
| Power up | | | Xb |

A write to this legacy address clears the first, last flip-flop. The write data is irrelevant. The DMA master 314a handles a write to this legacy address, and keeps track of the state of this flip-flop. Thus, the DMA slave 400 does not require the flip-flop.

TABLE 13

Master Clear

| I/O address | Byte Device | Legacy Address | 000Dh |
| --- | --- | --- | --- |
| | | Slave Address | Base + Dh |
| | Word Device | Legacy Address | 00DAh |
| | | Slave Address | Base + Dh |
| Size | | | 0 bits |
| Type | | | Write only |
| Power up | | | N/A |

A write to this legacy address performs the same function as a hardware reset. The data written is irrelevant. The DMA master 314a handles writes to this legacy address in the same special way described above. There are four I/O slave writes if the legacy address is to the byte legacy DMA controller 202 and there are three I/O slave writes if the legacy address is to the word legacy DMA controller 204.

TABLE 14

Clear Mask Register

| I/O address | Byte Device | Legacy Address | 000Eh |
| --- | --- | --- | --- |
| | | Slave Address | Base + Fh |
| | Word Device | Legacy Address | 00DCh |
| | | Slave Address | Base + Fh |
| Size | | | 0 bits |
| Type | | | Write only |
| Power up | | | N/A |

A write to this legacy address causes the DMA master 314a to write to the multi-channel mask registers (described above) of the corresponding DMA slave channels 400, with bit 0 set to 0. There are four I/O DMA slave channel writes if the legacy address is to the DMA legacy controller 202, and there are three I/O DMA slave channel writes if the legacy address is to the word legacy DMA controller 204. The act of writing this address enables all four byte DMA channels or all three word DMA slave channels to accept DMA requests. The data written is irrelevant. The DMA master 314a handles a write to this register in the same special way described above.

The DMA master 314a will respond to and terminate a PCI I/O write to the legacy address of the temporary register and drives the bits "undefined".

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What we claim is:

1. A method of accessing a shared register at a compatible address, said shared register being shared by at least two slave devices, each said slave device providing access to said shared register at a unique address, a master device for coupling between said processor and said slave devices, the method comprising the steps of:

(a) said processor providing a cycle to access said shared register at said compatible address;

(b) said master device receiving said cycle;

(c) said master device translating said received cycle into a transaction, said transaction having a unique address corresponding to a slave device shared register;

(d) said master device providing said transaction after step c;

(e) said slave device receiving said transaction and providing access to said shared register corresponding to said unique address;

(f) said slave device providing a response to said master device after step e;

(g) said master device receiving said response after step f; and (h) said master device providing a response to said processor after receiving said response of step g.

2. The method of claim 1, wherein step c further includes:

said master device determining which of said slave devices should receive said cycle.

3. The method of claim 2, wherein if it is determined that more than one slave device should receive said cycle, steps d–g are repeated for each slave device receiving said transaction before step h.

4. The method of claim 3, wherein if said cycle is a read cycle and if it is determined that more than one slave device should receive said cycle, step h further includes:

merging together said response received from each slave device to form a single response to said processor.

5. A method of accessing a shared register at a compatible address, said shared register being shared by at least two slave devices, each said slave device providing access to said shared register at a unique address, a bus master, master device and said slave devices for coupling to a bus, the method comprising the steps of:

(a) said bus master providing a cycle to access said shared register at said compatible address;

(b) said master device accepting said cycle but also forcing said bus master to retry said cycle;

(c) said master device translating said received cycle into a transaction, said transaction having a unique address corresponding to a slave device shared register;

(d) said master device requesting control of said bus after accepting said cycle;

(e) said master device providing said transaction when control of said bus is granted;

(f) said slave device receiving said transaction and providing access to said shared register corresponding to said unique address;

(g) said slave device providing a response to said master device after step f;

(h) said master device receiving said response after step g and releasing control of said bus; and (i) said master device providing a response to said bus master when said bus master retries said cycle after receiving said response from said slave device.

6. The method of claim 5, wherein step c further includes:

said master device determining which of said slave devices should receive said cycle.

7. The method of claim 6, wherein if it is determined that more than one slave device should receive said cycle, steps e–h are repeated for each slave device receiving said transaction before said master releases control of said bus and wherein step i is performed after all of said slave devices have responded.

8. The method of claim 7, wherein if said cycle is a read cycle and if it is determined that more than one slave device should receive said cycle, step i further includes:

merging together said response received from each slave device to form a single response to said bus master.

9. A master device for providing a processor access to a shared register at a compatible address, said shared register being shared by at least two slave devices, each said slave device providing access to said shared register at a unique address, said master device for coupling between said processor and said slave devices, the master device comprising:

means for receiving a cycle from said processor requesting access to said shared register at said compatible address;

means for translating said received cycle into a transaction, said transaction having a unique address corresponding to a slave device shared register;

means for providing said transaction;

means for receiving a response from said slave device; and means for providing a response to said processor after said means for receiving a response from said slave device receives said response.

10. The master device of claim 9, further comprising:

means for determining which of said slave devices should receive said cycle.

11. The master device of claim 10, wherein if it is determined that more than one slave device should receive said cycle, said means for providing said transaction provides multiple transactions, each transaction having a unique address corresponding to one of said slave devices, and wherein said means for providing a response to said processor provides said response after all of said slave devices have responded.

12. The master device of claim 11, wherein if said cycle is a read cycle and if it is determined that more than one slave device should receive said cycle, said means for providing a response to said processor merges together said responses received from said slave devices to form a single response to said processor.

13. A master device for providing a bus master access to a shared register at a compatible address, said shared register being shared by at least two slave devices, each said slave device providing access to said shared register at a unique address, said bus master, said master device and said slave devices for coupling to a bus, the master device comprising:

means for accepting a cycle from said bus master requesting access to said shared register at said compatible address and forcing said bus master to retry said cycle;

means for translating said accepted cycle into a transaction, said transaction having a unique address corresponding to a slave device shared register;

means for requesting control of said bus after accepting said cycle;

means for providing said transaction when control of said bus is granted;

means for receiving a response from said slave device and releasing control of said bus; and means for providing a response to said bus master when said bus master retries said cycle after said means for receiving a response from said slave device has received said response.

14. The master device of claim 13, further comprising:

means for determining which of said slave devices should receive said cycle.

15. The master device of claim 14, wherein if it is determined that more than one slave device should receive said cycle, said means for providing said transaction provides multiple transactions before releasing control of said bus, each transaction having a unique address corresponding to one of said slave devices and wherein said means for providing a response to said bus master provides said response after all of said slave devices have responded.

16. The master device of claim 15, wherein if said cycle is a read cycle and if it is determined that more than one slave device should receive said cycle, said means for providing a response to said bus master merges together said responses received from said slave devices to form a single response to said bus master.

17. The master device of claim 13, further comprising:

a completion flag, said completion flag set when said responses are received;

wherein if said completion flag is cleared when said cycle is received, said master device forces said bus master to retry said cycle, and wherein if said completion flag is set when said cycle is received, said master device provides said response and clears said completion flag.

18. A computer system, comprising:

a bus for communicating bus transactions;

a processor for providing a cycle;

at least two slave devices coupled to said bus, each said slave device having a shared register at a unique address, each said slave device further comprising:

means coupled to said bus for receiving bus transactions addressed to said shared register at said unique address; and means for providing a response to said bus transaction; and a master device coupled to said bus and said processor, comprising:

means for receiving a cycle from said processor requesting access to said shared register at a compatible address;

means for translating said received cycle into a bus transaction having a unique address corresponding to a slave device shared register;

means for providing said bus transaction;

means for receiving a response from said slave device; and means for providing a response to said processor after receiving said response from said slave device.

19. The computer system of claim 18, wherein said master device further includes:

means for determining which of said slave devices should receive said bus transaction.

20. The computer system of claim 19, wherein if it is determined that more than one slave device should receive said cycle, said means for providing said bus transaction provides multiple bus transactions, each bus transaction having a unique address corresponding to one of said slave devices, and wherein said means for providing a response to said processor provides said response after all of said slave devices have responded.

21. The computer system of claim 20, wherein if said cycle is a read cycle and if it is determined that more than one slave device should receive said cycle, said means for providing a response to said processor merges together said responses received from said slave devices to form a single response to said processor.

22. The computer system of claim 18, wherein said master device further includes a register for indicating a unique address of each slave device, and wherein each said slave device further includes a register for indicating said unique address.

23. A computer system, comprising:

a bus for communicating bus transactions;

a bus master coupled to said bus for providing a cycle;

at least two slave devices coupled to said bus, each said slave device having a shared register at a unique address, each said slave device further comprising:

means coupled to said bus for receiving bus transactions addressed to said shared register at said unique address; and means for providing a response to said bus transaction; and a master device coupled to said bus, comprising:

means for accepting a cycle from said bus master requesting access to said shared register at said compatible address but also forcing said bus master to retry said cycle;

means for translating said accepted cycle into a bus transaction, said bus transaction having a unique address corresponding to a slave device shared register;

means for requesting control of said bus after accepting said cycle;

means for providing said bus transaction when control of said bus is granted;

means for receiving a response from said slave device and releasing control of said bus; and means for providing a response to said bus master when said bus master retries said cycle after said response is received from said slave device.

24. The computer system of claim 23, wherein said master device further comprises:

means for determining which of said slave devices should receive said bus transaction.

25. The computer system of claim 24, wherein if it is determined that more than one slave device should receive said cycle, said means for providing said bus transactions provides multiple bus transactions, each bus transaction having a unique address corresponding to one of said slave devices and wherein said means for providing a response to said bus master provides said response after all of said slave devices have responded.

26. The computer system of claim 25, wherein if said cycle is a read cycle and if it is determined that more than one slave device should receive said cycle, said means for providing a response to said bus master merges together said responses received from said slave devices to form a single response to said bus master.

27. The computer system of claim 23, wherein said master device further includes a register for indicating a unique address of each slave device, and wherein each said slave device further includes a register for indicating said unique address.

28. The computer system of claim 23, wherein said master device further includes a completion flag, said completion flag set when said reponses are received, wherein if said completion flag is cleared when said cycle is received, said master device forces said bus master to retry said cycle, and wherein if said completion flag is set when said cycle is received, said master device provides said response and clears said completion flag.

29. A method of accessing an 8237 compatible DMA register at a compatible address, said DMA register being shared by at least two DMA slaves, each said DMA slave providing access to said DMA register at a unique address, a DMA master for coupling between said processor and said DMA slaves, the method comprising the steps of:

(a) said processor providing a cycle to access said DMA register at said compatible address;

(b) said DMA master receiving said cycle;

(c) said DMA master translating said received cycle into a transaction, said transaction having a unique address corresponding to a DMA slave DMA register;

(d) said DMA master providing said transaction after step c;

(e) said DMA slave receiving said transaction and providing access to said DMA register corresponding to said unique address;

(f) said DMA slave providing a response to said DMA master after step e;

(g) said DMA master receiving said response after step f; and (h) said DMA master providing a response to said processor after step g.

30. The method of claim 29, wherein step c further includes:

said DMA master determining which of said DMA slaves should receive said cycle.

31. The method of claim 30, wherein if it is determined that more than one DMA slave should receive said cycle, steps d–g are repeated for each DMA slave receiving said transaction before step h.

32. The method of claim 31, wherein if said cycle is a read cycle and if it is determined that more than one DMA slave should receive said cycle, step h further includes:

merging together said response received from each DMA slave to form a single response to said processor.

33. The method of claim 30, wherein said 8237 compatible DMA register contains certain bits and remaining bits, said certain bits indicating said remaining bits correspond to only one of said DMA slaves, wherein if said cycle is a write cycle indicating only one of said DMA slaves, said determining step is based on said certain bits contained in write data of said write cycle, and wherein if said cycle indicates multiple of said DMA slaves, said determining step causes steps d–g to be repeated for each of said multiple DMA slaves, each transaction having a different unique address.

34. A method of accessing an 8237 compatible DMA register at a compatible address, said DMA register being shared by at least two DMA slaves, each said DMA slave providing access to said DMA register at a unique address, a bus master, DMA master and said DMA slaves for coupling to a bus, the method comprising the steps of:

(a) said bus master providing a cycle to access said DMA register at said compatible address;

(b) said DMA master accepting said cycle but also forcing said bus master to retry said cycle;

(c) said DMA master translating said received cycle into a transaction, said transaction having a unique address corresponding to a DMA slave DMA register;

(d) said DMA master requesting control of said bus after accepting said cycle;

(e) said DMA master providing said transaction when control of said bus is granted;

(f) said DMA slave receiving said transaction and providing access to said DMA register corresponding to said unique address;

(g) said DMA slave providing a response to said DMA master after step f;

(h) said DMA master receiving said response after step g and releasing control of said bus; and (i) said DMA master providing a response to said bus master when said bus master retries said cycle after receiving said response from said slave device.

35. The method of claim 34, wherein step c further includes:

said DMA master determining which of said DMA slaves should receive said cycle.

36. The method of claim 35, wherein if it is determined that more than one DMA slave should receive said cycle, steps e–h are repeated for each DMA slave receiving said transaction before said DMA master releases control of said bus and wherein step i is performed after all of said slave devices has responded.

37. The method of claim 36, wherein if said cycle is a read cycle and if it is determined that more than one DMA slave should receive said cycle, step i further includes:

merging together said response received from each DMA slave to form a single response to said bus master.

38. The method of claim 35, wherein said 8237 compatible DMA register contains certain bits and remaining bits, said certain bits indicating said remaining bits correspond to only one of said DMA slaves, wherein if said cycle is a write cycle indicating only one of said DMA slaves, said determining step is based on said certain bits contained in write data of said write cycle, and wherein if said cycle indicates multiple of said DMA slaves, said determining step causes steps e–h to be repeated for each of said multiple DMA slaves, each transaction having a different unique address.

39. A DMA master for providing a processor access to an 8237 compatible DMA register at a compatible address, said DMA register being shared by at least two DMA slaves, each said DMA slave providing access to said DMA register at a unique address, said DMA master for coupling between said processor and said DMA slaves, the DMA master comprising:

means for receiving a cycle from said processor requesting access to said DMA register at said compatible address;

means for translating said received cycle into a transaction, said transaction having a unique address corresponding to a DMA slave DMA register;

means for providing said transaction;

means for receiving a response from said DMA slave; and means for providing a response to said processor after said means for receiving a response from said DMA slave receives said response.

40. The DMA master of claim 39, further comprising:

means for determining which of said DMA slaves should receive said cycle.

41. The DMA master of claim 40, wherein if it is determined that more than one DMA slave should receive said cycle, said means for providing said transaction provides multiple transactions, each transaction having a unique address corresponding to one of said DMA slaves and wherein said means for providing a response to said processor provides said response after all of said DMA slaves have responded.

42. The DMA master of claim 41, wherein if said cycle is a read cycle and if it is determined that more than one DMA slave should receive said cycle, said means for providing a response to said processor merges together said responses received from said slave devices to form a single response to said processor.

43. The DMA master of claim 40, wherein said 8237 compatible DMA register contains certain bits and remaining bits, said certain bits indicating said remaining bits correspond to only one of said DMA slaves, wherein if said cycle is a write cycle indicating only one of said DMA slaves, said determining means is based on said certain bits contained in write data of said write cycle, and wherein if said cycle indicates multiple of said DMA slaves, said determining means causes said transaction to be repeated for each of said multiple DMA slaves, each transaction having a different unique address.

44. A DMA master for providing a bus master access to an 8237 compatible DMA register at a compatible address, said DMA register being shared by at least two DMA slaves, each said DMA slave providing access to said DMA register at a unique address, said bus master, said DMA master and said DMA slaves for coupling to a bus, the DMA master comprising:

means for accepting a cycle from said bus master requesting access to said DMA register at said compatible address but also forcing said bus master to retry said cycle;

means for translating said accepted cycle into a transaction, said transaction having a unique address corresponding to a DMA slave DMA register;

means for requesting control of said bus after accepting said cycle;

means for providing said transaction when control of said bus is granted;

means for receiving a response from said DMA slave and releasing control of said bus; and means for providing a response to said bus master when said bus master retries said cycle after said means for receiving a response from said DMA slave has received said response.

45. The DMA master of claim 44, further comprising:

means for determining which of said DMA slaves should receive said cycle.

46. The DMA master of claim 45, wherein if it is determined that more than one DMA slave should receive said cycle, said means for providing said transaction provides multiple transactions before releasing control of said bus, each transaction having a unique address corresponding to one of said DMA slaves and wherein said means for providing a response to said bus master provides said response after all of said DMA slaves have responded.

47. The DMA master of claim 46, wherein if said cycle is a read cycle and if it is determined that more than one DMA slave should receive said cycle, said means for providing a response to said bus master merges together said responses received from said slave devices to form a single response to said bus master.

48. The DMA master of claim 45, wherein said 8237 compatible DMA register contains certain bits and remaining bits, said certain bits indicating said remaining bits correspond to only one of said DMA slaves, wherein if said cycle is a write cycle indicating only one of said DMA slaves, said determining means is based on said certain bits contained in write data of said write cycle, and wherein if said cycle indicates multiple of said DMA slaves, said determining means causes said transaction to be repeated for each of said multiple DMA slaves, each transaction having a different unique address.

49. The DMA master of claim 44, further comprising:
a completion flag, said completion flag set when said responses are received;
wherein if said completion flag is cleared when said cycle is received, said DMA master forces said bus master to retry said cycle, and
wherein if said completion flag is set when said cycle is received, said DMA master provides said response and clears said completion flag.

50. A distributed direct memory access (DMA) controller, comprising:
at least one DMA channel, said DMA channel capable of being a bus slave when receiving commands, said DMA channel capable of being a bus master when performing DMA operations, each one of said at least one DMA channels further comprising:
a set of 8237 compatible registers, said registers being accessible from a base address;
a base address register for holding a unique base address; and
an enable bit for enabling and disabling said DMA channel.

51. The DMA channel of claim 50, further comprising:
a transfer size bit for indicating DMA transfer size.

52. A computer system, comprising:
a bus for communicating bus transactions;
a processor for providing a cycle;
a memory coupled to said bus;
an first input/output device having a direct memory access (DMA) slave for communicating data between said input/output device and said memory over said bus via DMA transfers, said DMA slave comprising:
a set of 8237 compatible DMA registers at unique addresses;
means coupled to said bus for receiving bus transactions addressed to said DMA registers at unique addresses; and
means for providing a response to said bus transaction; and
a DMA master coupled to said bus and said processor, comprising:
means for receiving a cycle from said processor requesting access to said DMA register at a compatible addresses;
means for translating said received cycle into a bus transaction having a unique address corresponding to a DMA slave DMA register;
means for providing said bus transaction;
means for receiving said response from said DMA slave; and
means for providing a response to said processor after said means for receiving said response from said DMA slave has received said response.

53. The computer system of claim 52, further comprising:
a second input/output device having a direct memory access (DMA) slave for communicating data between said input/output device and said memory over said bus via DMA transfers, said DMA slave comprising:
a set of 8237 compatible DMA registers at unique addresses;
means coupled to said bus for receiving bus transactions addressed to said DMA registers at unique addresses; and
means for providing a response to said bus transaction; and
wherein said DMA master further includes:
means for determining which of said DMA slaves should receive said bus transaction.

54. The computer system of claim 53, wherein if it is determined that more than one DMA slave should receive said cycle, said means for providing said bus transaction provides multiple bus transactions, each bus transaction having a unique address corresponding to one of said DMA slaves and wherein said means for providing a response to said processor provides said response after all of said DMA slaves have responded.

55. The computer system of claim 54, wherein if said cycle is a read cycle and if it is determined that more than one DMA slave should receive said cycle, said means for providing a response to said processor merges together said responses received from said slave devices to form a single response to said processor.

56. The computer system of claim 53, wherein said 8237 compatible DMA register contains certain bits and remaining bits, said certain bits indicating said remaining bits correspond to only one of said DMA slaves,
wherein if said cycle is a write cycle indicating only one of said DMA slaves, said determining means is based on said certain bits contained in write data of said write cycle, and
wherein if said cycle indicates multiple of said DMA slaves, said determining means causes said transaction to be repeated for each of said multiple DMA slaves, each transaction having a different unique address.

57. The computer system of claim 52,
wherein said DMA master further includes a register for indicating a unique address of each DMA slave, and
wherein each said DMA slave further includes a register for indicating said unique address.

58. A computer system, comprising:
a bus for communicating bus transactions;
a bus master coupled to said bus for providing a cycle;
a memory coupled to said bus;
an input/output device having a direct memory access (DMA) slave for communicating data between said input/output device and said memory over said bus via DMA transfers, said DMA slave comprising:
means coupled to said bus for receiving bus transactions addressed to said DMA register at said unique address; and
means for providing a response to said bus transaction; and
a DMA master coupled to said bus, comprising:
means for accepting a cycle from said bus master requesting access to said DMA register at said compatible address but also forcing said bus master to retry said cycle;
means for translating said accepted cycle into a bus transaction, said bus transaction having a unique address corresponding to a DMA slave DMA register;
means for requesting control of said bus after accepting said cycle;
means for providing said bus transaction when control of said bus is granted;
means for receiving a response from said DMA slave and releasing control of said bus; and
means for providing a response to said bus master when said bus master retries said cycle after said means for receiving a response from said DMA slave has received said response.

59. The computer system of claim 58, further comprising:

a second input/output device having a direct memory access (DMA) slave for communicating data between said input/output device and said memory over said bus via DMA transfers, said DMA slave comprising:
  a set of 8237 compatible DMA registers at unique addresses;
  means coupled to said bus for receiving bus transactions addressed to said DMA registers at unique addresses; and
  means for providing a response to said bus transaction; and wherein said DMA master further comprises:

means for determining which of said DMA slaves should receive said bus transaction.

60. The computer system of claim 59, wherein if it is determined that more than one DMA slave should receive said cycle, said means for providing said bus transaction provides multiple bus transactions, each bus transaction having a unique address corresponding to one of said DMA slaves and wherein said means for providing a response to said bus master provides said response after all of said DMA slaves have responded.

61. The computer system of claim 60, wherein if said cycle is a read cycle and if it is determined that more than one DMA slave should receive said cycle, said means for providing a response to said bus master merges together said responses received from said slave devices to form a single response to said bus master.

62. The DMA master of claim 59, wherein said 8237 compatible DMA register contains certain bits and remaining bits, said certain bits indicating said remaining bits correspond to only one of said DMA slaves, wherein if said cycle is a write cycle indicating only one of said DMA slaves, said determining means is based on said certain bits contained in write data of said write cycle, and wherein if said cycle indicates multiple of said DMA slaves, said determining means causes said transaction to be repeated for each of said multiple DMA slaves, each transaction having a different unique address.

63. The computer system of claim 58, wherein said DMA master further includes a register for indicating a unique address of each DMA slave, and wherein each said DMA slave further includes a register for indicating said unique address.

64. The computer system of claim 58, wherein if said cycle is a read cycle, said response includes read data and a completion indication, and wherein if said cycle is a write cycle, said response includes a completion indication.

65. The computer system of claim 64, wherein said DMA master further includes a completion flag, said completion flag set when said responses are received, wherein if said completion flag is cleared when said cycle is received, said DMA master forces said bus master to retry said cycle, and wherein if said completion flag is set when said cycle is received, said DMA master provides said response and clears said completion flag.

\* \* \* \* \*